(12) United States Patent
Huinink et al.

(10) Patent No.: US 6,339,956 B1
(45) Date of Patent: Jan. 22, 2002

(54) PNEUMATIC AUTOMOBILE TIRE WITH INTEGRATED SENSORS AND TRACTION CONTROL SYSTEM

(75) Inventors: Heinrich Huinink, Garbsen; Andreas Köbe, Hannover; Volkmar Fries, Garbsen; Klaus Kleinhoff, Rodenberg, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/307,505

(22) Filed: May 7, 1999

(30) Foreign Application Priority Data

Jan. 4, 1999 (DE) .......................................... 199 00 082

(51) Int. Cl.[7] .............................................. B60C 15/00
(52) U.S. Cl. .................... 73/146; 73/146.4; 152/152.1; 340/445; 340/447
(58) Field of Search ................................ 73/146, 146.2, 73/146.3, 146.4, 146.5; 152/152.1; 340/438, 442, 443, 445, 446, 447, 448

(56) References Cited

U.S. PATENT DOCUMENTS

| 4,625,207 A | 11/1986 | Skeie ........................... 342/51 |
| 4,625,208 A | 11/1986 | Skeie ........................... 342/51 |
| 4,725,841 A | 2/1988 | Nysen ........................... 342/44 |
| 5,520,231 A | * 5/1996 | Myatt ........................... 73/146 |
| 5,562,787 A | * 10/1996 | Koch et al. .................... 73/146 |
| 5,573,610 A | * 11/1996 | Koch et al. .................... 73/146 |
| 5,573,611 A | * 11/1996 | Koch et al. .................... 73/146 |
| 5,885,388 A | * 3/1999 | Ueyoko et al. |
| 5,894,086 A | * 4/1999 | Jao et al. ....................... 73/146 |
| 5,895,854 A | * 4/1999 | Becherer et al. .............. 73/146 |
| 5,977,870 A | * 11/1999 | Rensel et al. ............... 73/146.5 |

FOREIGN PATENT DOCUMENTS

| DE | 3407254 | 10/1984 |
| EP | 0505906 | 9/1992 |

* cited by examiner

*Primary Examiner*—Eric S. McCall
(74) *Attorney, Agent, or Firm*—Smith, Gambrell & Russell, LLP

(57) ABSTRACT

A pneumatic vehicle tire includes a carcass, a bead with a bead core arranged in the bead, and a first sensor located within the bead. The first sensor delivers signals which are correlated to frictional forces transmitted by the pneumatic vehicle tire during operation. This sensor has a first end and a second end, wherein the first end includes a heel attached to the bead core and the second end extends radially outward from the bead core within the tire. A plurality of such sensors can be included in each tire, some for measuring longitudinal forces in a circumferential direction of the tire and others for measuring lateral forces in an axial direction of the tire.

23 Claims, 9 Drawing Sheets

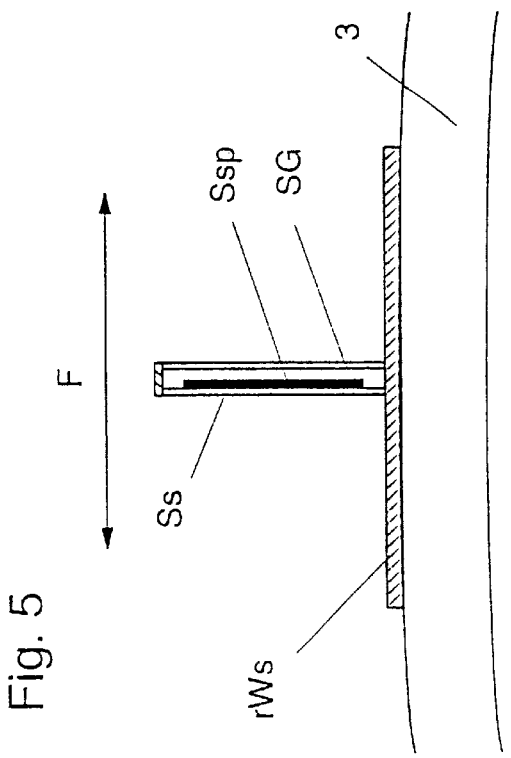
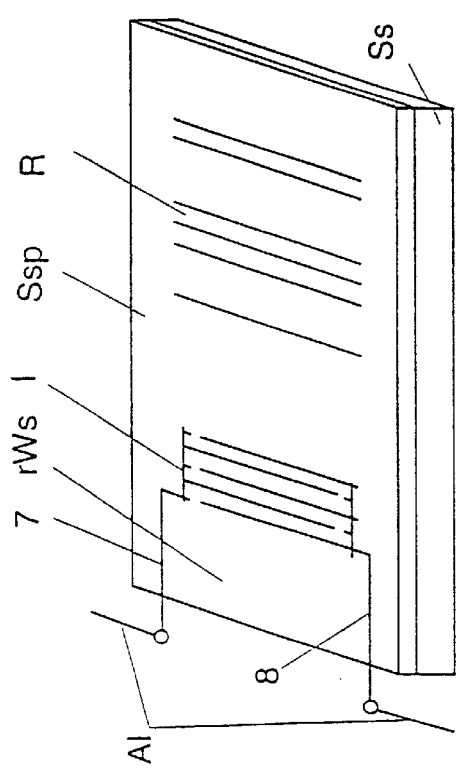
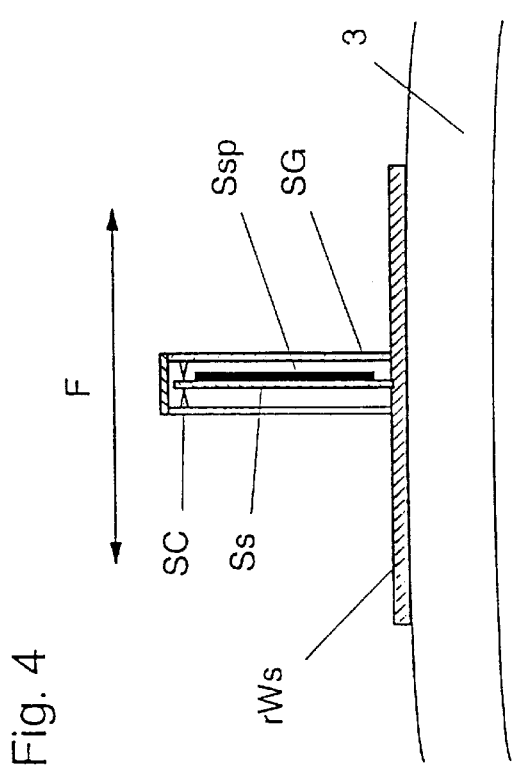
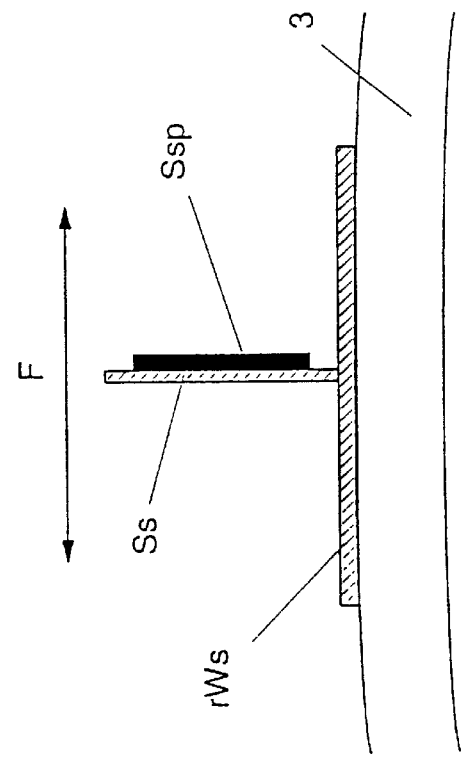

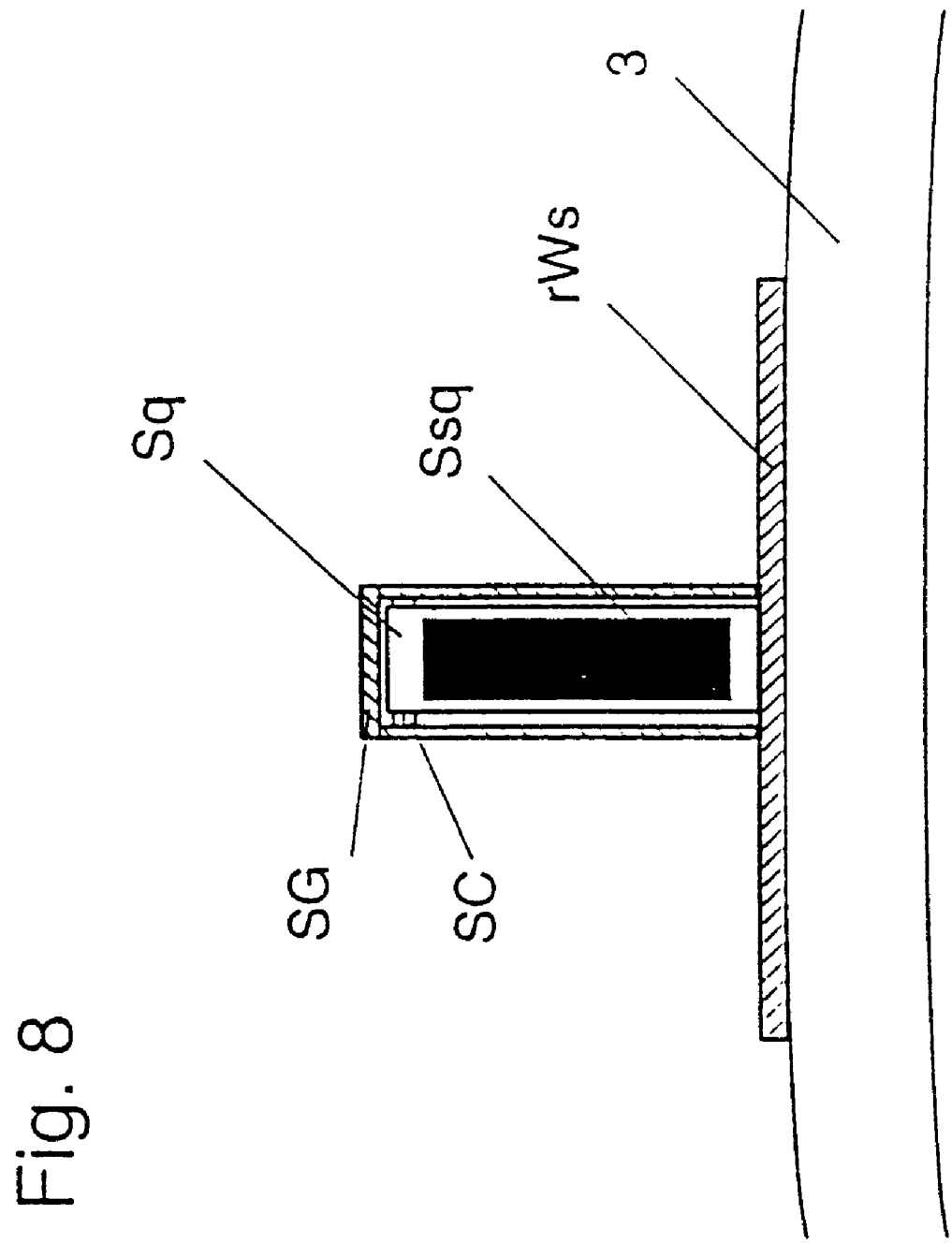

PNEUMATIC AUTOMOBILE TIRE WITH INTEGRATED SENSORS AND TRACTION CONTROL SYSTEM

INTRODUCTION AND BACKGROUND

The present invention pertains to a pneumatic automobile tire (1) which contains beads (2) with bead cores (3) arranged therein, wherein at least one sensor (S) is arranged in the pneumatic automobile tire (1). This sensor delivers signals that are correlated to the forces transmitted by the tire during its operation. Such information on tire forces serves for controlling the brakes and the chassis.

It is known to arrange sensors in tires, e.g. from DE 39 37 966 A1, DE 43 35 938 A1 and EP 06 02 679 B1. In these instances, the sensors are inserted between the base of the tread groove and the top belt layer.

All known sensors arranged in tires have the disadvantage of requiring an electric supply voltage. The supply voltage may be transmitted from the non-rotating car battery/on-board network to the rotating wheel via brushes, generated by means of a generator arranged in the rotating wheel (e.g., according to DE-OS 34 07 254) or stored in a battery or the like which is arranged in the rotating wheel.

According to the current state of the art, the arrangement of a round cell battery in the tire or the wheel rim appears the most advantageous option for providing the energy supply. However, most drivers only consider this feasible if the battery has a service life of more than three years. The most important factors for ensuring such a long battery service life are

- a low power consumption per transmission signal (i.e., a very short transmission period per signal or very low transmission power) which, however, contradicts another objective, namely an absolutely reliable signal identification in the receiver, due to the multitude of weak electromagnetic waves being dispersed,
- a low frequency of transmission signals per time unit (which appears feasible for monitoring the air pressure, but can only be utilized for traction control purposes by limiting the control precision),
- a high battery capacity (which increases the weight and cost of the system),
- a very low self-discharge current, and
- a low internal resistance and a low voltage drop at decreasing temperatures down to 40° C.

Although devices of this type were successfully tested in experimental automobiles, they have not been incorporated into a series production so far, wherein the incorporation into systems that also serve for traction control purposes, i.e., systems according to the present invention, currently appears improbable due to limitations of currently available batteries.

In addition, batteries of this type are difficult to exchange or can be easily stolen.

In order to solve this problem, EP-PA 03 63 570 already proposed to arrange the sensors that sense the longitudinal and/or lateral forces in a non-rotating system situated in the vicinity of the tire, e.g., on a transversal swinging arm of the wheel suspension, rather than in the tire. However, these measuring points are positioned relatively far from the tire contact area—at which the transmission of forces between the automobile and the road takes place—namely even farther than in a conventional ABS system.

The elasticities, masses and oscillatory pulses between the sensors and the tire contact area (caused by stiffness fluctuations of rolling bearings and driving elements) diminish the precision of the measurement. The lower the precision, the farther the nominal slip between the tire tread and the road which is predetermined for the ABS or ESP system needs to lie below the critical slip—for maximum brake maneuvers—in order to prevent overmodulation of deviation. This means that a correspondingly longer stopping distance must be accepted.

The principle of a non-rotating sensor arrangement is also utilized in DE-OS 44 35 160 A1 by the same applicant and the corresponding PCT/EP95/03864. However, the variable to be sensed, namely the side wall torsion, occurs in the rotating wheel. This principle makes it possible to determine deformations of the rotating wheel by means of non-rotating sensors arranged outside of the wheel. In this case, the forces are not directly measured, but rather the changes in time intervals, in which markings arranged on the tire pass by non-rotating sensors.

In comparison to ABS systems which were supplied with information via a magnet wheel until now, this system represents huge progress, namely because the mass of the wheel rim and the hub with its sleeve is no longer incorporated into the inertia calculation, i.e., this system allows faster control. However, applicants desired to broaden their knowledge and increase production by means of an internal development which resulted in a solution, in which the sensor is arranged in the rotating wheel.

The aforementioned measurement of the side wall torsion showed that torsional vibrations between the radially inner and the radially outer measuring track occur when continuously driving straight. Consequently, instantaneous torsion values showed intense fluctuations from the quotient longitudinal force/torsional rigidity. This influence can only be calculated by means of high resolution, i.e., a high pole number per magnetic track.

However, this effect also provides certain advantages, namely for detecting tread depth and aquaplaning, e.g., as described in the respective applications DE-OS 197 16 586.9 and 19 725 775.5. However, this effect also complicates the measurement of the longitudinal force which is of the utmost importance.

U.S. Pat. Nos. 4,625,207, 4,625,208 and 4,725,841 pertain to systems for obtaining signals from a passive transponder that carries phase-coded information.

EP 0 505 906 B1 discloses a pneumatic tire with an IC transponder that is arranged in the structure of the tire and used for tire identification, wherein an air pressure detector is incorporated into the transponder, and wherein said transponder is arranged on the axially inner side of the sealing inner liner together with its pressure detector.

DE-OS 41 12 738 discusses the fact that certain tire specifics vary from type to type. For example, tires of one manufacturer show a slightly different curve of the coefficient of friction $\mu$ as a function of slip than tires by another manufacturer, namely even if the tires have the same dimensions. The critical slip of one tire type may, in particular, be higher than that of another tire type.

Manufacturers of ABS systems usually attempt to achieve an optimal slip that is as high as possible, but sufficiently low for preventing the dreaded overmodulation of the brakes with all tires. This measure serves for preventing that, after a slightly excessive brake pressure, the brake pressure is excessively decreased, whereafter excessive brake pressure is built up again, etc. This means that the deviation is increased.

In such automobiles, this results in the tires which have the steepest $\mu$-slip curve always performing best in brake tests, namely even if other tires reach a higher $\mu$; the higher slip required by these other tires is, however, not even reached due to the cautious nature of the controller which is based on the steepest $\mu$-slip curve stored in said controller.

The aforementioned DE 41 12 738 discloses a method for controlling and/or regulating automobile systems, wherein information on the properties of the actually mounted tires—e.g., the $\mu$-slip curve—is not stored in the controller, but rather in the tire so as to attain a superior tire identification system. In addition, this information is fed to the controller directly from the tire such that the controller bases the respective manipulations on the $\mu$-slip curve that fits the individual tire—namely even if different tires are used.

According to one embodiment of this invention, a data carrier is arranged on the axially inner side of the inner tire bead.

The progress reports of the VDI (Association of German Engineers), Volume 8, No. 515, contains a report on the colloquium "Contactless Transmission of Measurement Data and Power" of Nov. 30, 1995 which was held at the College of Technology in Darmstadt and organized by Special Research Branch 241 of the German Research Association.

On pages 62–79 of this publication, L. Reindl and V. Magori of Siemens AG report on "Radio Sensors with Passive Surface Wave Components" and propose a signal-generating element which is referred to as a "sensor" (but actually also contains other elements) and contains a rod, the length of which can be changed, wherein said rod is provided with a layer consisting of one or more piezoelectric crystals, e.g., silicon dioxide.

This element operates in accordance with the principle of passive radio transmission, i.e., without any other energy supply. In this case, an electromagnetic wave received from a transmitter is converted into an acoustic surface wave of the piezoelectric crystal layer, to which an electric wave of identical propagation speed is coupled due to the piezo property.

In this case, it is essential that the thusly determined propagation speed lies below the propagation speed of electromagnetic waves by approximately 5 powers of ten. Consequently, the reflection is delayed in such a way that it is not lost in the primary echo that follows the transmission pulse.

In order to realize the differentiation from the primary echo of the transmission signal, the term "slow echo" was used in this application; this refers to the echo, the energy of which is converted into a solid-borne sound wave in the preferred passive sensor before it is forwarded—in the form of an electromagnetic wave—to the receiver (that may be identical to the transmitter).

The delay depends on the length change and consequently the change in the distance traveled by the wave. However, the length change is proportionally linked to the bending stress and consequently the introduced force by Hook's Law.

An article by Dipl.-Ing. Dr. Techn. A. Pohl, Dipl.-Phys. L. Reindl and Dipl.-Ing. H Scherr entitled "Wireless Measurements with Passive OFW Sensors on the Example of Monitoring Tire Air Pressure" appeared on pages 305–317 of VDI Reports, collection No. 1350 which pertains to presentations at the 6th symposium "Tires, Chassis, Road" of the VDI Association "Automobile and Traffic Engineering" which was held on Oct. 23 and 24, 1997 in Hannover. This collection of reports was published by the VDI Publishing House, Düsseldorf.

We believe that this is the first and thus far only publication that pertains to the utilization of an OFW sensor on a rotating wheel. In FIG. 5 on page 313 of this publication, an integrated OFW pressure measuring device is shown. According to the text portion on page 315, this pressure measuring device was arranged in the cavern of the tire, wherein a foil fixed to the tire flank was used as the sensor antenna. In lines 2 and 3 of page 316 of this report, it was already proposed to arrange the sensor element in the rubber of the tire.

Due to the aforementioned circumstances and the current state of the art—in which, depending on one's point of view, either PCT/EP95/03864 or the last-mentioned VDI report are considered as being most closely related to the present mention—it would be desirable to place a sensor for measuring the forces transmitted by the tire in such a way that a direct measurement of the forces, namely at least the longitudinal forces, can be realized in a particularly simple and low-weight fashion, namely without impairing the tire properties, in particular, its weight and its rolling resistance.

Thus, it is an object of the invention to directly measure the forces transmitted by the tire in an improved way.

SUMMARY OF THE INVENTION

The above and other objects of the present invention can be achieved in a pneumatic automobile tire (1) with beads (2) and bead cores (3) arranged therein, wherein at least one sensor (S) that delivers signals which are correlated to the forces transmitted by the tire during its operation is arranged in the pneumatic automobile tire (1). At least one of the sensors (S) that deliver signals which are correlated to the forces transmitted by the tire during its operation is arranged within the region of a bead (2).

In that case, all sensors (S) arranged within the region of a bead (2) should preferably operate in accordance with the principle of passive radio transmission i.e., these sensors should be able to alter or phase-shift radio signals received from a non-rotating device (G) in a defined correlation to the variable (F1 and/or Fq) to be sensed and transmit the altered or phase-shifted signals to a receiver (E), namely without any other type of energy supply.

The required receiver should be non-rotatably arranged in the vicinity of each wheel to be monitored, preferably in a position in which the receiver is fixed to the hub or the swinging arm.

The sensor arrangement according to the invention within the bead region has the disadvantage that the mechanical deformations to be sensed at this location are significantly smaller than, for example, the mechanical deformations occurring between the belt edge region and the bead region in the system according to PCT/EP95/03864. However, this sensor arrangement also provides certain advantages:

A detailed analysis of torsional tire vibrations showed that these torsional vibrations do not have the same intensity within all tire regions. In such a phase, for example, in which the oscillating movement of the tire tread area around the rotational axis lets the tire tread be in a hastening-forward-position, the wheel rim must be in a hastening-after-position. After half a period, the opposite analogously applies: When the osciallating movement of the tire tread areas around the rotational axis lets the tire be in a hastening-after-position, the wheel rim must be in a hastening-forward-position. The smaller the amplitude of the rim is, the greater its inertial mass is. Because the inertial mass of the rim differs from that of the tire tread, its amplitude differs from that of the tire tread, namely in that reciprocal manner explained above.

This led the inventors to conclude that an area which is almost free of torsional oscillation must exist between the tire tread surface and the wheel rim. The precise radius of the circle, on which the torsional oscillation amplitude becomes zero, depends on the mass distribution between the tire on one hand and the wheel rim with the hub and, if so required, the brake disk on the other hand. The precise radius of this circle also depends on the mass and stiffness distribution within these components, but the radius of this circle always lies slightly above the outer radius of the bead cores.

The precise radius of this circle which significantly simplifies the metrology while serving as the measuring location can be calculated in surprisingly accurate fashion with the conventional FEM (finite element method).

With respect to the preferred combination of the features of the invention, according to which all sensors (S) arranged within the region of a bead (2) operate in accordance with the principle of passive radio transmission, the slight deformations which can be detected at this location and were initially perceived as a disadvantage actually provide a synergistic advantage because this sensor type cannot be subjected to excessive deformations.

If a sensor is stiffer than the rubber surrounding the sensor, the field lines of identical stress are concentrated in the sensor. If a sensor is less stiff than the rubber surrounding the sensor, the sensor repels field lines of identical stress. Consequently, a concentration of field lines occurs within the rubber, namely in the vicinity of the sensor. This means that both constellations cause irregularities in the stress field and the deformation field—although irregularities of different types. The irregularities in the stress field lead to lateral stress concentrations in the rubber layer surrounding the sensor. The irregularities in the deformation field lead to eccentricities. In order to prevent these disadvantages, it would be most favorable if the stiffness of the sensor would correspond to the stiffness of the surrounding rubber in all directions; however, this cannot be achieved with 100% accuracy, but the bead represents the most favorable location for arranging sensors that operate in accordance with the surface wave principle because the stiffest rubber mixtures are used at this location.

The preferred combination of the characteristics of the invention does not require a magnetic pole track on the tire in order to generate data for all of the traction control system—e.g., the brake control (ABS), the control of the driving torque and the slip adjustment that differs with respect to the wheel positions in order to prevent skidding (ESP).

Consequently, it is not possible for the magnetic track to be removed by abrasion, e.g., when the tire contacts a curb stone. In addition, a weight increase—which is unavoidable when embedding magnetizable particles—is prevented.

The sensor arrangement within the bead region also results in a particularly low distortion of the calibration curves when standing waves occur in the tire tread and side wall region—which is typical in the high-speed range.

The signal transmission path
a) between sensor and receiver (when using a central automobile transmitter) or
b) between transmitter and sensor and between sensor and receiver (when using one individual sensor transmitter per wheel which—just like the receiver—should be positioned as close to the wheel as possible)
can be maintained relatively small while preventing contact of the components with one another if the wheel is subjected to high stress and correspondingly deformed; the signal transmission path may lie at 4 mm for race cars—and for passenger cars if the possibility of snow chains does not have to be taken into consideration. With respect to passenger cars that use snow chains, the signal transmission path should lie at approximately 13 mm, wherein the signal transmission path for trucks is correspondingly longer. Due to the fact that the required signal transmission path is maintained so short, the risk of receiving external signals is relatively low.

The sensor (S) according to the invention is preferably configured similar to a tongue, wherein its heel (Ws) is fastened to a bead core (3), and wherein the sensor extends radially outward from the bead core. The fastening of the exceptionally stiff bead core produces a connection with a very stable reference system. The radially outward protruding tongue deforms in the circumferential direction proportional to the longitudinal force transmitted by the tire and in the axial direction proportional to the transmitted lateral force.

In order to ensure that the slow echo has a sufficient intensity and can be adequately influenced, the sensor (S1, Sq)—i.e., the tongue coated with piezo crystals—is made flat. According to invention, this tongue should, in addition to its radial extent, essentially have a certain axial extent in order to sense longitudinal forces. According to another feature of the invention, this tongue should, in addition to its radial extent, essentially have a certain extent in the circumferential direction in order to sense lateral forces.

In order to measure the longitudinal force transmitted by the tire and/or the tire deflection, the pneumatic automobile tire (1) according to a further detailed aspect of the invention preferably contains at least two sensors (S1) on a track near the bead core in uniform phase distribution; with respect to a redundance and a constant calibration curve as a function of the position of the rotational angle of the monitored wheel, a larger number of sensors, in particular, 3, would be even more favorable. The longitudinal force transmitted by the tire is correlated to the sum of the signals from the sensors (S1). It is important that all sensors (S1) used for this purpose have the same sensitivity.

In still a further aspect of the invention, in order to measure the lateral force transmitted by the tire and/or the tire deflection, the pneumatic automobile tire (1) preferably contains at least three sensors (Sq) of identical sensitivity on a track near the bead core, namely in uniform phase distribution.

It goes without saying that both aforementioned sensor quantities refer to the bead region, in the vicinity of which the receiver is arranged, i.e., usually the inner bead. If the tire to be monitored can also be mounted in reverse fashion, the suggested quantity of sensors naturally should be arranged within the left and the right bead region.

Thus, the pneumatic automobile tire according to the invention preferably contains several sensors for sensing longitudinal forces as well as several sensors for sensing lateral forces. Consequently a complete control of the tire slip is possible, as required for skid and roll prevention systems (ESP), anti-lock brake systems (ABS) and traction control systems.

In the previously known concurring system according to PCT/EP95/03864 by the same assignee, certain complications arise due to the fact that the mechanical calibration curve, i.e., the longitudinal force transmitted by the tire as a function of the tire side wall torsion, depends on the air pressure. In a highly inflated condition, a steel-belted radial tire—to which the invention primarily pertains—not only behaves stiffer than in a less inflated condition with respect to its radial deflection, but also with respect to its elastic torsion between the tire tread and the beads. In a highly inflated condition, a higher longitudinal force occurs between the passing of the marks assigned to one another on different radii at the same torsional angle and consequently the same interval.

Although this effect of the aforementioned invention may prove useful—namely for monitoring the air pressure or the wheel load—if information on the transmitted longitudinal force or the effective wheel load or the existing air pressure is obtained otherwise, this particular solution is not offered in the form of a system consisting of individual modular options, but only as a complete package. Some customers consider this an unfair pricing policy by the manufacturer.

The present invention also fulfills the secondary requirement of achieving a practically constant calibration curve, at least within the air pressure interval +20% to −30% referred to as the nominal air pressure. For this purpose, the invention provides for arranging the radial center (Ssm) of each sensitive surface (Ss) at the radial distance from the bead core (3), at which the cross section of the carcass (4) has a point of inflection.

This additional development of the invention is based on the proposition that the dependence of the calibration curve on the air pressure is essentially not caused by, for example, the change in expansion (nearly no variation of stretch), but rather a curvature change of the strength due to a torsional moment, the plane, within which a strength carrier from bead to bead can be illustrated, extends slightly lateral to the radial if viewed in the form of a side view. Within this plane, the distance between the bead to the belt edge increases on both sides of the tire; however, since the carcass arc length between the bead and the belt edge increases less than that of the aforementioned increase in distance due to the high tensile rigidity of the strength carrier, the largest portion of the increase in distance results from the reduction in bulge of the strength carrier curve within the side wall region, namely in the transverse plane that now extends lateral to the radial, i.e., from a straightening in the sense of a reduction in bulge of the strength carrier.

However, an increase in the air pressure also causes stretching (=reduction in bulge) of the strength carrier. The less bulgy the cross section of the carcass is when no longitudinal forces are transmitted by the tire, the less likely it is that the tire will be additionally stretched due to longitudinal forces; the deformations per deformation force consequently become smaller, i.e., the tire exhibits stiffness.

However, a reduction in bulge cannot occur at locations at which no bulge exists, i.e., in the point of inflection of the carcass. With respect to the lesser deformations occurring at this location, only the shear strength G of the rubber, the tensile strength of the strength carrier and the corresponding thickness as well as tread densities are important, i.e., variables that entirely or at least essentially do not depend on the air pressure.

In an additional aspect of the invention, with an invariant air pressure calibration curve, it is proposed to realize a combination with other measuring systems that measure air pressure or at least deliver variables which depend on air pressure and can be compared to the defined variables that do not depend on the air pressure.

A combination with the solution according to the VDI Reports, supra, on pages 305–317 of collection No. 1350 appears particularly practical. In this case, the air pressure is determined by means of a load cell and a surface wave data transmission, wherein this method for measuring the air pressure is combined with the feature of passive radio transmission. This combination has the advantage that full operational monitoring can be realized without an electric power supply in the rotating wheel or any other additional means. However, a gradual displacement of the air pressure calibration scale must be expected over very long operating times due to air diffusion in the load cell.

In addition, a combination with the solution according to PCT/EP95/03864 may be considered because the evaluation of the difference between the tire forces, preferably the longitudinal tire forces, calculated by means of the two different methods makes it possible to deduce the tire air pressure without an electric power supply on the rotating wheel. However, this requires a magnetic track on the tire; consequently, sufficiently constant calibration curves can be ensured, namely even over long operating times.

The embodiment operating with the method of passive radio transmission is preferably additionally developed with respect to the fact that all sensors contained in the wheel operate with passive radio transmission. This means that no additional sensors which operate on a different principle should be arranged within the wheel so as to not lose the advantage of eliminating a rotating voltage supply and prevent false signal transmissions. If other sensors are used for monitoring the driving conditions or the air pressure, they should be arranged outside the wheel, preferably in non-rotating fashion, and operate in accordance with a different signal transmission method or at least a clearly different signal transmission frequency.

Although it is possible to determine system variables on one and the same tire with sensors of different design, such compromise solutions result in more disadvantages than advantages. Consequently, it is proposed to provide all sensors contained in the tire in the form of passive, linear acoustic surface wave components.

These OFW components are—if arranged within the bead region—unexpectedly resistant in reference to the brisk accelerations and shocks to which a tire is subjected; sensors that operate in accordance with this principle appear to remain functional up into the high-speed range if arranged at this location.

According to another aspect of the invention, all sensors (S) contained in the pneumatic automobile tire (1) preferably contain a layer (Ssp) with one or more piezoelectric crystals, wherein said layer couples an electric wave of identical propagation speed to an acoustic surface wave. With respect to the temperature independence, the mechanical stability under load, the availability of manufacturing technology and the price, $SiO_2$ is particularly suitable as a piezoelectric crystal.

As generally known with this measuring principle, at least one of the sensors (S)—preferably all sensors—contains an interdigital converter (I) in order to increase the signal yield.

The transmission and reception frequency preferably lies between 20 MHz and 2.5 GHz.

Since no data processing can be carried out in the rotating system due to the passivity of the sensors, i.e., different data components need to be simultaneously received in order to process data, all sensors of one tire operate with transmission frequencies which differ from one another at least to such an extent that the respectively received signals can be separated from one another by carrier frequency. In this case, no discrete phase positions of the rotating wheel, in which the data transfer should take place, need to be determined in order to identify the data source; this means that a quasi-continuous measurement is possible.

The term "quasi-continuous" used in this application refers to the fact that the intervals between successive transmission pulses are shorter than the response times of the actuators. It was determined that it is possible for these intervals to have a duration of 1/50000 second. Even at a speed of 180 km/h, i.e., 50 m/sec, and a wheel circumference of approximately 2 m, i.e., a rotary frequency of 25 Hz, a conventional ABS system or a system according to the aforementioned PCT/EP95/03864 would require an unrealistically high number of 2000 marks (approximately 60 marks are usually used) on the circumference in order to achieve a comparable chronological resolution. In the system according to the invention, the chronological resolution also remains identically high at slow speeds, but this chronological resolution decreases proportionately to the speed in both concurring systems.

For example, when driving on snow, i.e., at speeds around 60 km/h rather than 180 km/h, the invention allows very fast measurement and consequently very high control precision. At such a speed, the interval between the individual measurement results is approximately 1/100 of the intervals attained so far.

The intervals between the individual measurement pulses could possibly be additionally reduced; in this case, the lower limit is defined by the fact that the delay in the OFW element needs to be sufficiently long such that the primary transmission pulse including its primary echo has already faded before the slow echo is sent back, and by the fact that the next primary transmission pulse is only transmitted after the slow echo has faded.

Due to the high chronological resolution of the measurement results obtained in accordance with the invention, it is also possible to additionally process these measurement results by means of analog technology instead of digital technology. It may be possible to additionally smooth out the signals by means of a simple circuit—e.g., a small capacitor and a resistance—as it is generally known from the pulsation damping following rectifiers. Until now, analog signal processing systems can be more easily realized with high insensitivity to shocks and temperatures than digital circuits.

It is particularly practical if a) a signal that is proportional to the torque, b) a signal that is proportional to the deflection and c) a signal that is proportional to the lateral force are obtained independently of the position of the rotational angle of the wheel. In this case, all devices for measuring the rotational angle—e.g., a magnet wheel in conventional ABS systems or a track of magnetic markings according to PCT/EP95/03864—can be eliminated. This reduces manufacturing expenditures, precludes possible errors and prevents signals of low resolution.

In a first approximation, the following can be stated for the local side wall torsions—namely by neglecting the tire flattening—if it is assumed that the bond between the belt and the tire tread forms a first quasi-rigid ring and the bead core on the wheel rim forms a second quasi-rigid ring:

$$s_1 = V_M + Z\sin(\text{phi})$$

$$s_2 = V_M + Z\sin\left(\text{phi} + \frac{1}{n} 360°\right)$$

$$s_3 = V_M + Z\sin\left(\text{phi} + \frac{2}{n} 360°\right)$$

...

$$s_n = V_M + Z\sin\left(\text{phi} + \frac{n-1}{n} 360°\right)$$

wherein $V_M$ represents the rotation of the first ring (tire tread+belt) relative to the second ring (wheel rim+bead core) which is proportional to the torque, Z represents the eccentricity between both rings in the Z direction (vertical axis), and phi represents the instantaneous rotational angle of the wheel. In this case, $s_1$ represents the composite deformation on the sensor S1 which can be detected in the side view, $s_2$ represents the analogous composite deformation on the sensor S2 which can be detected in the side view, etc.

The Becherer-Kleinhoff formulas mentioned below can be derived from this statement, wherein said formulas allow, namely without knowledge of the rotational angle phi of the wheel, to quasi-continuously a) measure the applied torque with only two sensors that respond to deformations in the circumferential direction (preferably three sensors so as to be able to utilize the same sensors as for "b)", and b) (also) measure the tire deflection with only three sensors that respond to deformations in the circumferential direction.

When using n uniformly distributed sensors (n represents a natural number greater or equal to 2), the torque M is determined by the equation:

$$M = C_M \frac{s_1 + s_2 + \ldots s_n}{n}$$

In this case, $C_m$ represent a calibration factor that essentially describes the—air pressure-dependent—torsional rigidity of the tire.

When using n uniformly distributed sensors (n represents a natural number greater or equal to 3), the tire deflection Z is determined from:

$$Z = C_Z \sqrt{2} \sqrt{\frac{s_1^2 + s_2^2 + \ldots + s_n^2}{n} - \left(\frac{s_1 + s_2 + \ldots s_n}{n}\right)^2}$$

In this case, $C_z$ represents a calibration factor that describes the uniformity of the side wall torsion over the radial extent of the side wall. The more uniform the distribution, the closer $C_z$ lies near 1. If the torsional rigidity is higher in the region in which the sensor extends than in the remaining region, $C_z$ is greater than 1; this probably represents the most common instance. However, if the torsional rigidity is, by way of exception, lower in the region in which the sensor extends than in the remaining region, $C_z$ is lower than 1.

In addition, the tire should contain three additional sensors in order to realize the preferred measurement of the complete tire load. These additional sensors respond to lateral deformations q and consequently allow a measurement of the cornering force. In a first approximation, the lateral deflection q of the side wall can also be described with a similarly simple statement —namely by neglecting tire flattening and lateral bending softness of both rings— i.e., under the ideal assumption that all deformations occur exclusively in the side walls:

$$q_1 = A_m + K\sin(\text{phi})$$

$$q_2 = A_m + K\sin\left(\text{phi} + \frac{1}{n} 360°\right)$$

$$q_3 = A_m + K\sin\left(\text{phi} + \frac{2}{n} 360°\right)$$

...

$$q_n = A_m + K\sin\left(\text{phi} + \frac{n-1}{n} 360°\right)$$

wherein $A_m$ represents the axial displacement of the first ring (tire tread+belt) relative to the second ring (wheel rim+bead core) which is averaged over the tire circumference and proportional to the lateral force, and wherein K represents the amplitude of the axial displacement path between both rings which is not constant over the circumference and is identical to the tire tread radius times the tilting angle between both rings. The tilting angle refers to the difference between the camber angle of the wheel rim and the camber angle of the tire tread. In other respects, phi also represents the instantaneous rotational angle of the wheel in this case. The reference symbol $q_1$ represents the composite deformation on the sensor Q1 which can be detected in a view in the driving direction, $q_2$ represents the analogous composite deformation on the sensor Q2 which can be detected in a view in the driving direction, etc.

This statement results in the following equations:

$$A_m = \frac{q_1 + q_2 + \ldots q_n}{n}$$

$$K = C_K \sqrt{2} \sqrt{\frac{q_1^2 + q_2^2 + \ldots + q_n^2}{n} - \left(\frac{q_1 + q_2 + \ldots q_n}{n}\right)^2}$$

In this case, the lateral force $F_q$ will adjust itself independently of the wheel load as $F_q = C_{Fa} \cdot A_m$.

However, the lateral force $F_q$ will adjust itself in dependence on the wheel load as $F_q = C_{Fk} \cdot K$.

The ratio between $C_{Fa}$ and $C_{Fk}$ appears to be a signal that can be evaluated as a function of the wheel load. Although this signal only occurs while driving through curves, it allows a sufficiently accurate determination of the wheel load while driving straight—since the load hardly changes while driving. Information on the air pressure can be obtained with this knowledge of the wheel load in connection with the signal Z that describes the deflection—which essentially depends on the ratio between the wheel load and the air pressure of the tire.

The previous explanations indicate that the sensor arrangement in the bead of the rotating tire makes it possible to describe all forces transmitted by the tire including the deformation (which is correlated to the wheel load) with a total of only six sensors, namely in quasi-continuous fashion as a function of time. This can be achieved independently of the position of the rotational angle of the wheel, i.e., in a non-rotating reference system. The rotational angle (phase position) consequently does not have to be determined when using 1t these measuring algorithms.

However, practical experiments showed less favorable results. The inventors believe that these inferior results are caused by the fact that the aforementioned equations are no longer entirely correct when a sensor passes through a phase region, in which the tire tread is flattened in contrast to the initially assumed ideal circumstances. Leaving aside the option of simply accepting these slight errors, there exist different methods for minimizing or entirely eliminating these inaccuracies:

A) The first option consists of using a slightly higher number (preferably 4 or 5) of sensors of each type, wherein the data of the sensors that are currently subjected to very fast changes are eliminated, and wherein the calculations are only carried out by utilizing the three remaining sensors of the respective type under such circumstances (in this case, the elimination frequency divided by n as the waste product results in a signal that is proportional to the wheel speed).

B) The second option consists of utilizing such a high number of sensors of each type that a constant number of sensors an essentially always situated within the contact area, i.e., the errors as a function of the time become essentially constant.

According to the experiences gained so far, strategy A is preferred.

In any case, the invention delivers a very dense, i.e., high resolution, and very accurate data base that can hardly be corrupted as a function of the time. Such an exceptional data base allows and utilizes particularly fast control algorithms and actuators. Traction control systems according to the invention consequently are able to adjust maximum traction on demand and require practically no safety margin with respect to critical slip. Where it has most meaning (e.g., on ice), a slip of 100% may—naturally by almost completely relinquishing the steerability—be achieved, wherein the aforementioned slip results in the longest delay on ice.

After discussing the data processing, the following description pertains to data identification (i.e., the identification of the respective data source):

It is—although preferred—not absolutely imperative to utilize different carrier frequencies. The data identification is obtained by separating the signals sent back to the receiver due to the fact that the sensors of identical transmission frequency differ from one another with respect to the arrangement of their reflecting structures. The present invention provides for an instance in which all sensors (S1) for sensing longitudinal forces utilize a common transmission frequency f1 and all sensors (Sq) for sensing lateral forces utilize a common transmission frequency f2. It is also conceivable that f2=f1 if all sensors of one wheel differ from one another with respect to the arrangement of their reflecting structures.

All longitudinal force sensors (S1) of one tire, according to the invention, have a first, identical pattern of reflecting structures, and all lateral force sensors (Sq) have a second, identical pattern of reflecting structures. In this case, all longitudinal force sensors (S1) of one tire need to operate with different transmission frequencies fa, fb, fc and all lateral force sensors (Sq) also need to operate with the same transmission frequencies fa, fb, fc.

In an additional development of the carrier frequency identification discussed herein, it is also possible to assign a different carrier frequency to each sensor of all tires mounted on an automobile. This embodiment which is advantageous for the manufacture of prototypes is, however, not preferred for a series production because a different tire would be required for each wheel position, i.e., it would be extremely difficult to obtain appropriate replacement tires.

A superior method for realizing the signal identification consists of maintaining a small signal transmission path in relation to the wheel gauge and the wheel base. This method allows a separation of signals in accordance with different wheel positions by evaluating the signal intensity at the respective antenna.

According to the OFW technology, at least one antenna needs to be arranged in the tire. One particularly preferred antenna for this purpose consists of a concentrically arranged narrow ring of metal foil that—if it is sufficiently narrow in relation to the side wall height and favorably placed in the radial direction—may be rigidly vulcanized onto the tire or even vulcanized into the tire rubber in order to lower the risk of injuries during operation and mounting of the tire.

The antenna should consist of a soft material that adheres well to rubber, i.e., brass foil is considered more suitable than steel foil. The average radius of such a foil ring for forming an antenna should preferably lie near or correspond to the radius, on which the cross section of the carcass has a point of inflection. Due to this measure, flattening effects which otherwise could become critical for the durability of the connection between the rubber and the metal are maintained very low. In addition, a synergistic combination characterized by the fact that the radial center (Ssm) of each sensitive surface (Ss) is arranged at the radial distance from the bead bore core (3) at which the cross section of the carcass (4) has a point of inflection results in the required cable lengths becoming very short or even zero.

If a separate antenna is assigned to each OFW sensor—in order to attain the previously described advantages—such a metal foil ring can be divided into corresponding sectors by means of interruptions, wherein one sector is assigned to each respective sensor.

The sensor-equipped tires according to the invention as well as their additional developments serve for creating a friction control system for an automobile. In such a—previously mentioned—friction control system in which all sensors (S) used operate on the same transmission frequency and—for the purpose of signal separation—at least one non-rotating transmission antenna (Gs) and a non-rotating reception antenna (Es) are assigned to each wheel position, and in which either the transmission antennas or the reception antennas—preferably the transmission antennas as well as the reception antennas—have a directional characteristic, each transmission antenna is preferably only excited in certain rotational positions of the pneumatic tire. In this case, the rotational positions naturally should be chosen such that the different sensors of one wheel do not simultaneously deliver signals, but rather in chronologically offset fashion such that signal separation is additionally promoted.

According to a more detailed aspect of the invention, each sensor (S1) for measuring longitudinal forces and, each sensor (Sq) for measuring lateral forces are preferably activated in a position vertically above and/or underneath the rotational axis of the wheel. In this case, only one sensor (S1 or Sq, respectively; also commonly referred to as "S") suffices; however, in order to increase the resolution and the redundance, three sensors are preferably used for measuring the longitudinal forces and for measuring the lateral forces.

The longitudinal forces transmitted by the tire are largely correlated to the torsions occurring vertically above or underneath the rotational axis of the wheel, wherein said correlation is largely independent of the tire deformation. In addition, these longitudinal forces are also correlated to the sum of the torsions of the tire horizontally in front and behind the rotational axis.

The tire deformation is correlated to the difference between the torsions in the rotating direction of the tire horizontally in front or behind the rotational axis of the wheel. The tire deformation also provides information on the ratio between the wheel load and the tire pressure.

The last-mentioned effect is used for additionally increasing the safety of the automobile, namely with the aid of an additional development of the invention. According to this aspect of the invention, the sensors (S1) which serve for measuring the longitudinal forces are—in order to limit the expenditure—also utilized for measuring the tire deformation, wherein said sensors are activated in a different position in order to measure the tire deformation, namely horizontally in front and/or behind the rotational axis of the wheel. Only one sensor (S1) would suffice for this purpose; however, a larger quantity of sensors is preferred, in particular, 3.

For particularly high quality requirements, a high chronological resolution proves advantageous. If the sensors are only read in certain rotational positions—which simplifies the data identification as described above—such a high chronological resolution is most easily achieved with a very large quantity of sensors. However, an excessively high price for sensors, in particular, OFW sensors, contradicts the realization of such an embodiment.

An identical chronological resolution can also be realized with a smaller quantity of sensors if the quantity of read-out points is increased. However, the data obtained in positions which are not exactly situated vertically above or underneath or horizontally in front or behind the rotational axis can only be evaluated after linking the data with suitable trigonometric functions. In addition, the risk of a double reception—i.e., an erroneous identification—becomes higher the closer the various transmission and reception devices are arranged relative to one another. Consequently, no more than eight uniformly distributed angular positions should be used for such a measurement.

However, the inventors have recognized that it would be advantageous to pursue the previously described train of thought; if all sensors used in one wheel differ with respect to their transmission frequency and/or their reflection pattern in each individual datum of all the data delivered by this sensor can be assigned to one individual sensor. The acquisition of measurement data does not have to correspond to any angular positions in this case. This means that a quasi-continuous delivery of data is possible, i.e., a chronological resolution that lies far above that of all known systems.

However, the data processing, in particular, the preferred automatic calibration of the friction control system, would become more difficult due to the necessity of acquiring the respective rotational angle, wherein the signal with the lowest chronological resolution also defines the chronological resolution of the entire data set; however, the positions of the rotational angles can only be measured with an accuracy of approximately +/−30 in conventional systems (this corresponds to 60 markings on the circumference). This obstacle is remedied with the additional development which provides that the friction control system be characterized by the fact that no measurement of the rotational angle (phi) of the wheel is carried out, wherein the data delivered by the sensors of one wheel in quasi-continuous fashion are set into such a relation to one another in a logic circuit (e.g., with an algorithm according to the Becherer-Kleinhoff equations for M, Z, $A_m$, K and $F_q$ discussed herein) that data pertaining to a non-rotating coordinate system are delivered at the output of the logic circuit. Logic circuits of this type which merely need to carry out additions, subtractions, multiplications, divisions, squarings and taking roots are inexpensive, fast and reliable.

In order to verify the functionality of an OFW measuring system according to the invention, it is practical to separate the sensor surface, i.e., the piezo-coated plate, within which the acoustic-electric or acoustic wave should travel, from the rubber by means of a housing. Due to this measure, this wave is prevented from attenuating to such a degree by the hysteresis-caused attenuation on the surrounding rubber that the energy for the electromagnetic back-transmission is no longer available.

However, initial tests indicated that the hysteresis losses can be maintained sufficiently low for eliminating the aforementioned housing beginning at a transmitter carrier frequency of 200 kHz. Thus, the utilization of the OFW sensors should be limited to locations that are free of—highly attenuating—butyl rubber, i.e., not on or in the inner liner that ensures air tightness.

BRIEF DESCRIPTION OF DRAWINGS

The invention will be further understood with reference to the accompanying drawings, wherein:

FIG. 3b, an embodiment with a wedge-shaped sensor heel that is positively and non-positively connected to the rectangular single wire bead core, and FIG. 3c, an embodiment with an annular sensor heel that is positively and non-positively connected to a cable bead core of approximately circular cross section;

FIGS. 4–6 show different detailed representations of an OFW longitudinal force sensor in the form of longitudinal sections on a scale that is not as enlarged as in FIGS. 1 and 2, namely, FIG. 4 represents an embodiment in which the sensitive surface is entirely separated from the surrounding rubber;

FIG. 5 represents an embodiment in which only the piezo-coated side of the sensitive surface is separated from the surrounding rubber, FIG. 6 represents an embodiment in which the sensitive surface is entirely embedded in the surrounding rubber, i.e., without any type of separation;

FIG. 6a shows an enlarged oblique view of the sensitive surface of an OFW sensor with the piezo-coated side on top and reflection lines therein;

FIG. 7a is an embodiment with a wedge-shaped sensor heel that is non-positively connected to the rectangular single wire bead core;

FIG. 7b is an embodiment with a wedge-shaped sensor heel that is non-positively and positively connected to the rectangular single wire bead core, FIG. 7c is an embodiment with an annular sensor heel that is non-positively and positively connected to the cable bead core of approximately circular cross section;

FIG. 8 shows a longitudinal section through a lateral force sensor; if viewed in the form of a cross section, the lateral force sensors should correspond to the longitudinal force sensors shown in FIGS. 4–6 in the form of longitudinal sections;

DETAILED EMBODIMENTS OF INVENTION

This invention will now be described in greater detail with reference to the drawings.

Figure 1:
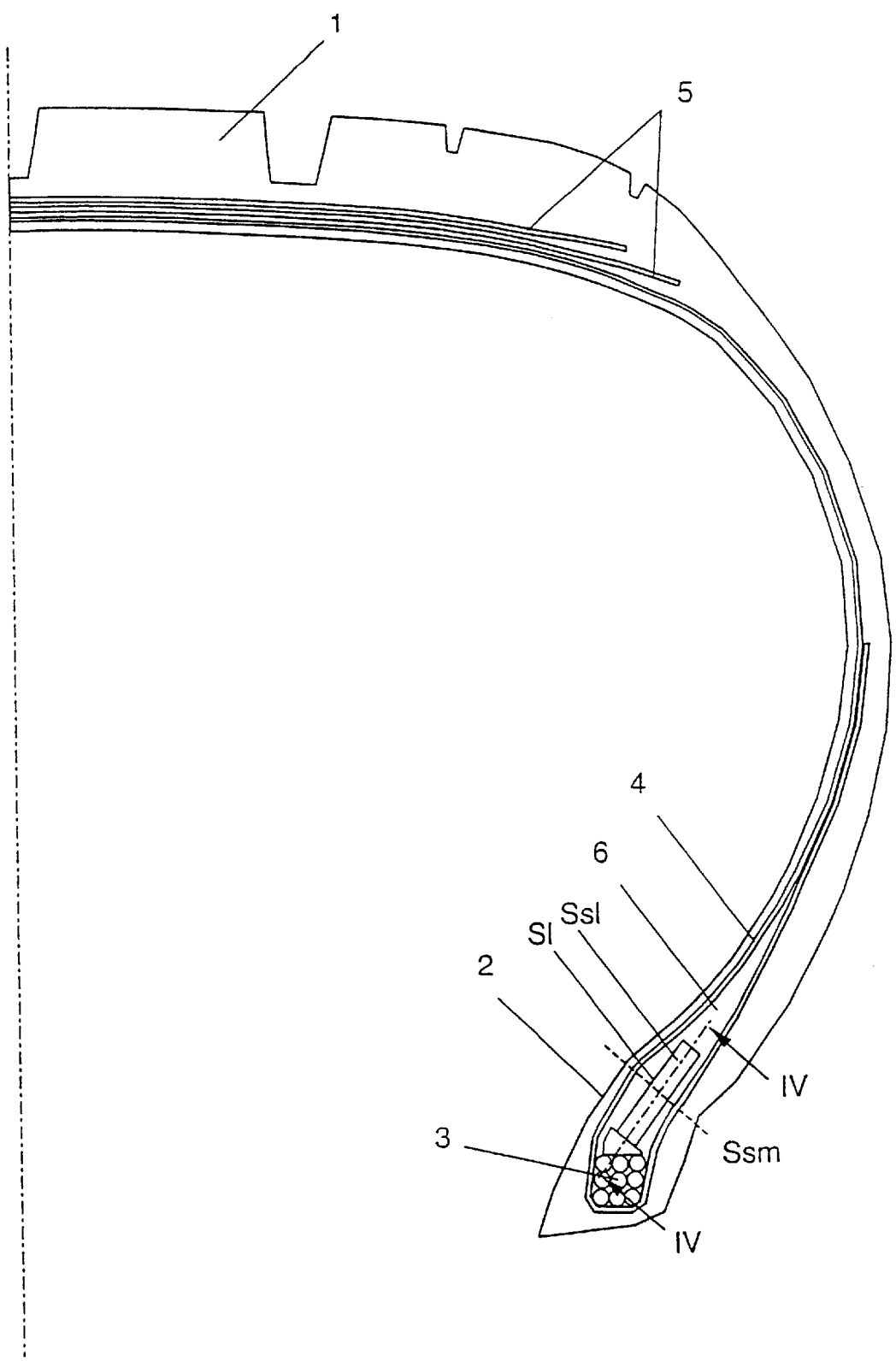
FIG. 1 shows the right upper half of a cross section through a tire according to the invention, wherein the tire is situated in such a rotational position that a circumferential force sensor is visible.

FIG. 1 shows the right upper half of a cross section through a pneumatic automobile tire 1 for passenger cars which conventionally contains two beads 2 with one respective bead core 3 arranged therein. In the embodiment shown, which is preferred for realizing the invention, the bead core 3 is wound into three layers that lie on top of one another from a single wire, wherein each layer contains three windings. This may also be realized with Pierce cores, of identical cross section, or with cable cores, of round cross section.

A single-layer radial carcass 4 of textile strength carrier, e.g., rayon, is also wound around the bead core 3 as is considered conventional for passenger car tires. The region, around which the carcass and the buckle are wound, is referred to as a "noose" in the lingo of tire designers. Two belt layers of steel cord are conventionally arranged above the carcass 4.

A bead filler 6 is arranged within this noose, namely radially outward and adjacent to the bead core 3. In this preferred embodiment of the invention, this bead filler contains ten recesses, at locations that are uniformly distributed over the circumference in each of which one respective sensor S is arranged.

In FIG. 1, the cross-sectional plane is turned in such a way that a circumferential force sensor (=longitudinal force sensor) S1 with the broad side of its tongue-shaped sensitive surface Ss1 is visible. The narrow side of the sensitive surface Ss1 is visible in the longitudinal section IV—IV; i.e., in the enlarged detail shown in FIG. 4; FIGS. 5 and 6 show other embodiments that are illustrated analogously to FIG. 4.

Figure 2:
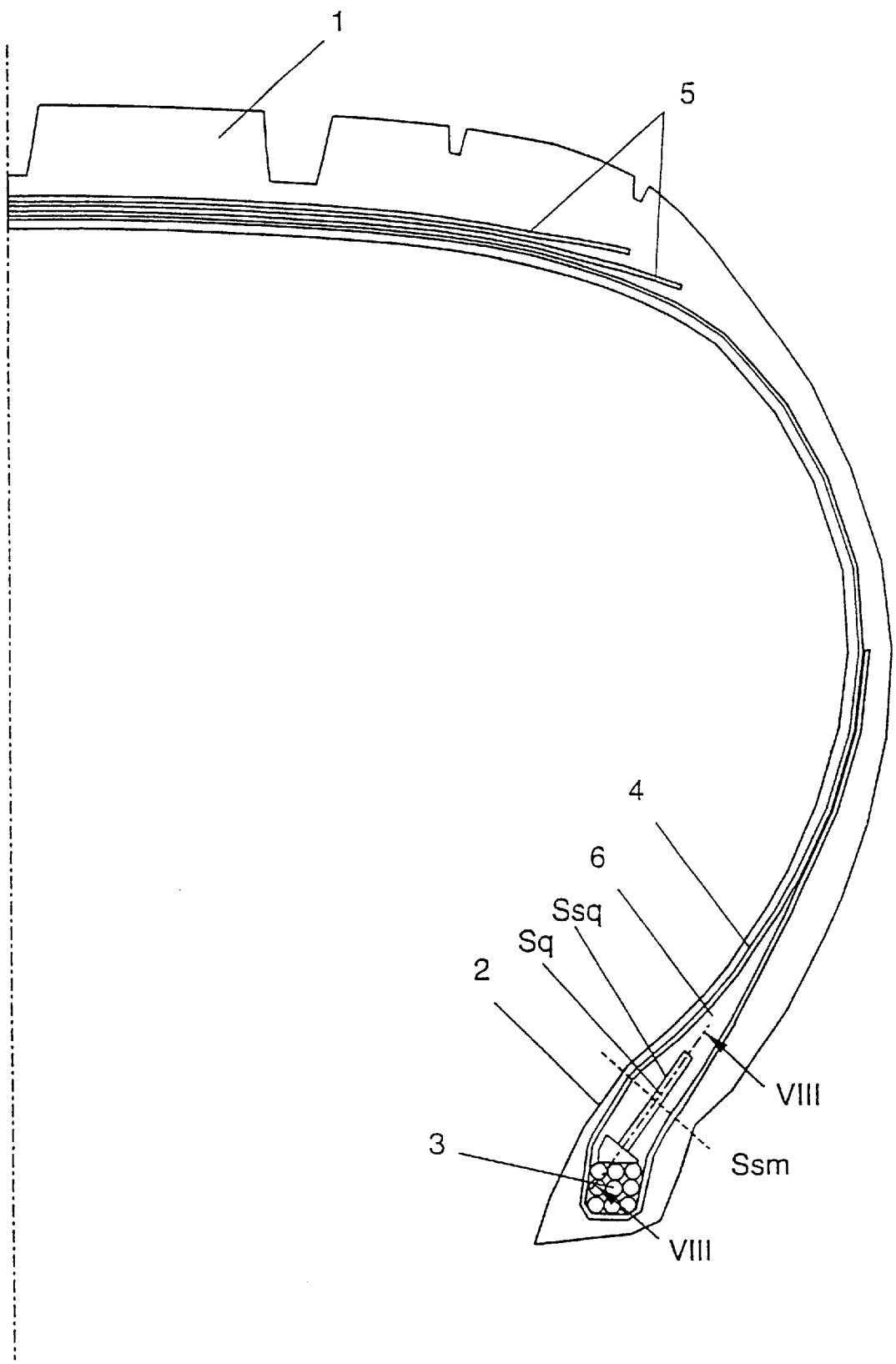
FIG. 2 shows the right upper half of a cross section through the same tire according to the invention, wherein the tire is, however, situated in such a rotational position that a lateral force sensor is visible.

In this embodiment, the sensor Si is, analogous to the sensor Sq of the same tire shown in FIG. 2, extended radially outward to such a degree that its radial center Ssm which is drawn with broken lines lies in the point of inflection of the carcass such that a measurement that does not depend on the air pressure is attained. If the measurement does not have to be independent of the air pressure, shorter sensor dimensions would be possible, e.g., as short as 5 mm. The incline of the sensor referred to the axial could also be chosen smaller in this case; this incline could even be adjusted to zero such that a wedge-shaped intermediate piece on the sensor heel is eliminated.

In FIG. 2 which is illustrated analogously to FIG. 1 and shows the same tire 1, the cross-sectional plane is turned in such a way that a lateral force sensor Sq with the narrow side of its tongue-shaped sensitive surface Ssq is visible. The radial center Ssm of the sensitive surface of the lateral force sensor Sq is also situated in the point of inflection of the carcass which is drawn with broken lines. The broad side of the sensitive surface Ssq is visible in the longitudinal section VIII—VIII that is shown in FIG. 8 on a larger scale.

Figure 3C:
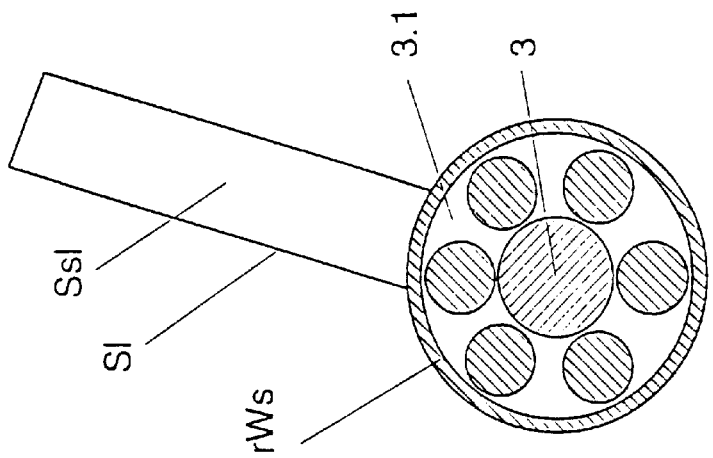
FIGS. 3a–3c show different detailed representations of a section of FIG. 1 on a larger scale, wherein the bead core 3 and a longitudinal force sensor S1 with its heel which is arranged above the bead core are visible, namely, FIG. 3a, an embodiment with a wedge-shaped sensor heel that is non-positively connected to the rectangular single wire bead core.
Figure 3B:
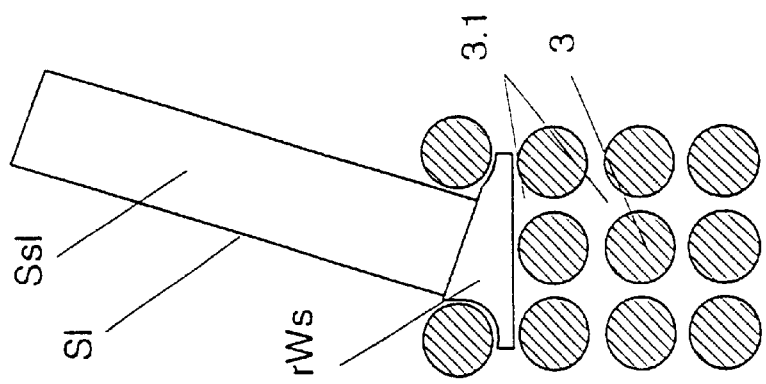
Figure 3A:
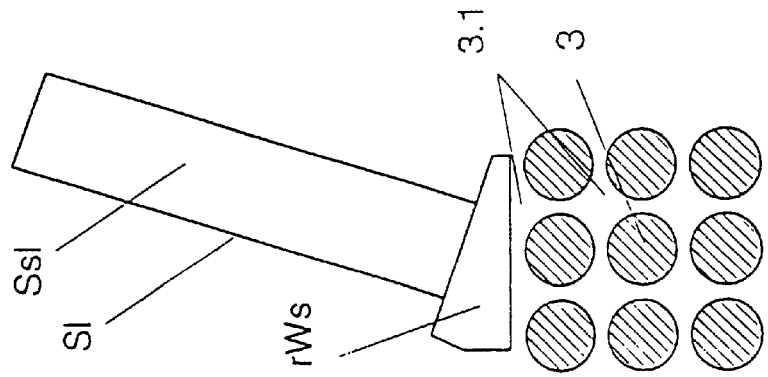

FIG. 3a shows a section of FIG. 1 on a larger scale, wherein the bead core 3 and the longitudinal force sensor S1 situated above the bead core are visible in this figure. The heel rWs of the sensor Si is realized in wedge-shaped fashion so as to achieve a tangent adaptation of the incline of the sensitive surface Ss1 to the incline of the carcass. The heel rWs allows a simple, rigid and dimensionally accurate attachment of the sensor S1 on the bead core. In this preferred embodiment, the required stability of the bond is achieved due to the contact adhesiveness of the caoutchouc extrusion coating 3.1 of the bead core 3, namely because a sufficiently large contact surface for the bead core situated underneath is provided. At least the radially inner side of the heel rWs should be coated with brass or the like in order to ensure a high adhesion after vulcanization.

FIG. 3b shows a different embodiment of the sensor heel rWs on the same scale. In this case, the contact adhesiveness is supplemented with a positive connection. For this purpose, an additional wire or a textile thread is placed over the radially outer region of the sensor heel rWs in such a way that its radially inner side presses against the radially outer side of the bead core 3. In this case, the additional wire may also consist of one additional winding of the wire forming the bead core.

FIG. 3c shows a third embodiment of the sensor heel rWs on the same scale, wherein this sensor heel is connected to a cable core. In order to also achieve an additional positive connection in this case, the sensor heel rWs is realized in the form of a ring that can be flattened in plastic fashion, wherein the entire cable core extends through said ring.

When assembling the tire, all sensors S1 and Sq that need to be mounted on the respective bead core 3 are threaded onto the wire section that subsequently forms the cable core, namely before the cable core is connected to form an endless cable core. Subsequently, this wire section is connected to form an endless ring, whereafter the sensors are moved into the correct, preferably uniform, distance from one another and aligned. The sensors are then fixed in position by flattening the eyelet-shaped sensor heels rWs. In this case, an eyelet-shaped sensor heel rWs, which was preferably flattened beforehand, may simultaneously serve for connecting the cable core to form an endless cable core.

Due to this measure, the entire radially outer side of the bead core 3, and consequently each sensor, lies on the same radius referred to the rotational axis.

If other techniques are used for connecting the bead core to form an endless bead core, slight deviations in the radial positioning of different sensors of a series of identical sensors may result; in particular, in the vicinity of a layer end of a Pierce core. These slight variations may be compensated by avoiding a positioning on the layer end or by means of adapted high sensor heels. Alternatively, the deviations can be rendered harmless by means of an individual calibration of all sensors of each tire after its vulcanization, wherein said calibration is automated for cost reasons.

The annular assemblies consisting of the bead core 3, the bead filler 6 and the sensor; S1 and Sq situated therein which may be realized in accordance with any of the embodiments described above are preferably placed onto the endless carcass in such a rotational position that each sensor, in particular, the sensors S1 for sensing the longitudinal force, are situated as far as possible from the carcass connecting point. It goes without saying that a uniform torsional and bending stiffness of the tire side wall should be achieved over the entire circumference, preferably by utilizing the characteristics of the not yet published German Patent Application, 197 46 618.

FIGS. 4, and 6 which were briefly mentioned above show different complex embodiments of OFW sensors used for tires according to the invention. Among these three embodiments, the one according to FIG. 4 provides the highest degree of functional separation. A housing SG that completely surrounds the sensitive surface Ss, on which a piezo-crystalline layer Ssp is situated, is rigidly arranged on the sensor heel rWs as well as the sensitive surface itself. The radially inner end of the sensitive surface Ss is fixed on the sensor heel rWs such that this fixation is not flexible. However, the radially outer end of the sensitive surface Ss is arranged between two low-friction blades SC without play, wherein said radially outer end can, however, be bent.

If forces F—in this case, circumferential forces F1—act in one of the shown directions as is the case when side wall torsion occurs, the housing SG is bent and this also bends the radially outer end of the sensitive surface Ss via the blades SC. Consequently, the sensitive surface is also bent. If a force that acts from the right toward the left engages the housing SG, the sensitive surface Ss is also bent toward the left such that the arc length of the piezo-crystalline layer is extended; if the force acts in the opposite direction, the piezo arc length would be correspondingly shortened.

Leaving aside the blades SC and the sensor heel rWs, the sensitive surface Ss is not connected to the rubber that surrounds the housing without play and in preferably adhesive fashion in this embodiment. Consequently, a damaging attenuation of the deformation wave within the piezo-crystalline layer by the rubber surrounding the housing is precluded.

The embodiment according to FIG. 4 is transformed into the embodiment according to FIG. 5 by fusing together the separate left housing wall according to FIG. 4 with the substrate of the sensitive surface Ss, on which the piezo-crystalline layer is situated. The piezo-crystalline layer points toward the inside of the housing; this means that this layer does not come into direct contact with the rubber.

The advantages of a lower number of components, a reduced space requirement and a reduced influence on the true running of the tire are, opposed by the risk that the mechanical large-surface connection to the surrounding rubber could highly attenuate the deformation wave within the piezo-crystalline layer, although indirectly, namely, by acting upon the non-coated side of the sensitive surface.

According to experience gained so far, this disadvantageous effect remains sufficiently small at a sufficiently high frequency; if very fast deformations occur, the molecular transformations required for plastic rubber deformation can, as meanwhile recognized, hardly occur, i.e., the rubber behaves glasshard.

The embodiment according to FIG. 6 utilizes the aforementioned effect even better. In this case, no housing is provided around the sensitive surface. This not only reduces the manufacturing costs, but also the space requirement for each sensor arranged within the bead filler profile (=apex). Although it can, in principle, never be avoided that a measuring device or sensor acts upon the component to be monitored, this generally undesirable reaction effect is diminished due to the reduction of the structural space. The reaction on the true running of the tire is also least apparent in this case.

However, the reaction of fluctuating rubber quality—the fluctuations from batch to batch, from temperature to temperature as well as from tire type to tire type—have the most intense effect on the calibration curves. Leaving aside that the inventors expect the embodiment according to FIG. 5 to be preferred for the manufacture of large quantities, and that the additional refinements according to the embodiment shown in FIG. 6 are currently preferred for the early development stage, in which the first prototypes are manufactured, the embodiment according to FIG. 4 appears to be the most favorable embodiment because it requires the least knowledge about the mechanical behavior of rubber at high frequency, i.e., a field that has not been the subject of any publications so far.

However, the inventors have already discovered the most important principles of this new field and developed extensive additional measuring programs required for describing the material behavior even more precisely in such a way that no additional creativity appears to be required for their constructive utilization; however, these programs require some development time; until then, the prototypes should be manufactured in accordance with FIG. 4.

FIG. 6a shows the tongue-like sensitive surface Ss in the form of an enlarged oblique view; namely, in the condition in 1 which it is installed into a sensor according to FIG. 4. The piezo-crystalline coating Ssp lies on top. The radio pulses that are received by the sectionally illustrated antenna A1 assigned to the sensor which do not contain any information, but rather only sufficient energy, are introduced into the sensitive surface Ss via lines 7 and 8 that are embedded in the sensor heel rWs. The aforementioned radio pulses are also referred to as primary signals in this publication. The lines 7 and 8 conduct the primary signals to an interdigital converter I that converts at least part of the received radio energy into a solid-borne sound wave that is emitted perpendicular to the interdigital converter within the piezo-crystalline layer.

Figure 9:
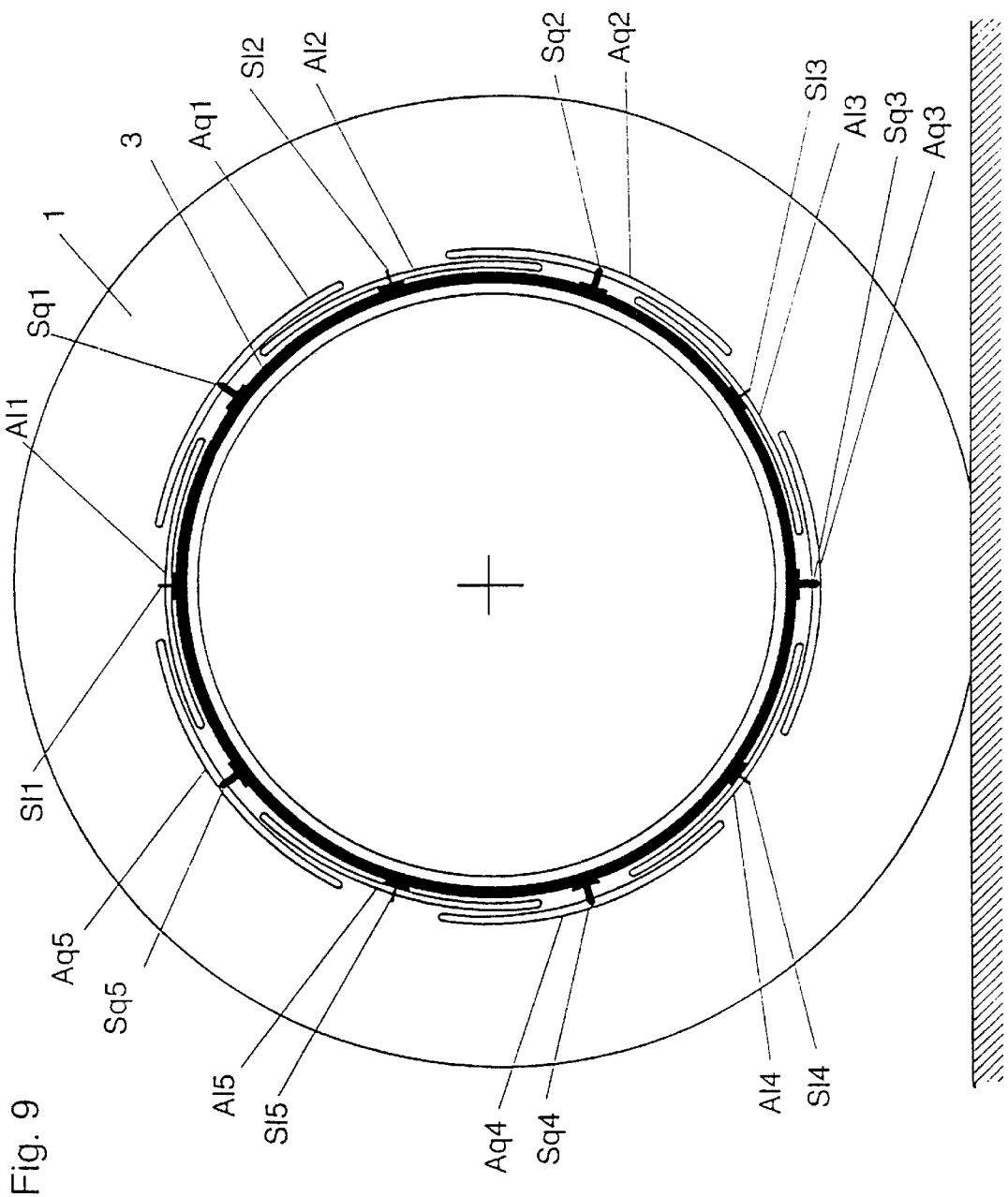
FIG. 9 shows a wheel with a tire containing sensors according to the invention on a smaller scale, namely in the form of a view of the axially inner side.

Similar to a light beam in an optical waveguide which does not leave the optical waveguide due to total reflection, the solid-borne sound wave, to which an electric wave is coupled due to the piezo property, essentially only propagates within the sensitive surface (but not only within the piezo-crystalline layer). On its propagation path, this sound wave encounters partially reflecting lines R. The signals reflected by these lines travel back to the interdigital converter I and then to the assigned antenna A1, a complete side view of which is shown in FIG. 9, via the electric lines 7, 8.

From this antenna, the signals are transmitted to a non-rotating receiver (schematically illustrated in FIG. 11) in the form of an electromagnetic wave, i.e., as a radio signal (="slow echo")—that now contains information.

The wave propagation speed within the sensitive surface Ss and consequently also within the piezo-crystalline layer barely changes due to its expansion or contraction because a zone of contraction or expansion, respectively, lies in its immediate vicinity; the sensor consists of a bending rod and not a tension or compression rod. A reduced mass per length in the tension zone of the bending rod is at least largely compensated by an increased mass per length in the compression zone of the bending rod.

This means that the wave propagation speed within the piezo-crystalline layer essentially does not depend on the degree of bending of the sensitive surface Ss. However, the geometric distance between the reflecting lines R changes, i.e., the interval between the slow echoes caused by these lines also changes. If the piezo-crystalline layer is situated in the tension zone of the bend, the path to be traveled by the solid-borne sound wave is extended such that the intervals between the diverse slow echoes are also increased; the opposite applies in the compression zone. This change in the time interval provides the desired information.

In principle, only one partially reflecting line R would suffice for obtaining the desired information; the time interval to be measured then lies between the arrival of the slow echo from this partially reflecting line and the almost completely reflecting end of the sensitive surface which faces away from the sensor heel.

The arrangement of several partially reflecting lines R, as shown in FIG. 6a, also makes it possible to obtain additional information, in particular, information for identifying the respective information source, i.e., an identification of the individual sensors. Different sensors of identical radio frequency consequently differ from one another with respect to the number and/or distribution of their partially reflecting lines.

It is also possible to arrange a piezo-crystalline layer Ssp on both sides of the sensitive surface Ss. In order to achieve simple manufacture as well as simple data evaluation including data source identification, i.e., sensor identification, both sides should have exactly the same pattern of partially reflecting lines. Since the reference pattern is thus stored in the sensitive surface; i.e., it does not have to be stored in a series-connected component of the logic evaluation unit, a self-training neuronal network can be realized particularly easily in this embodiment. At a comparable sensor size, the sensitivity of this embodiment in comparison to an embodiment with only one piezo-crystalline layer is doubled because the reference pattern is no longer rigid, but rather compressed to the degree to which the other reference pattern is extended and vice versa.

Figure 7A:
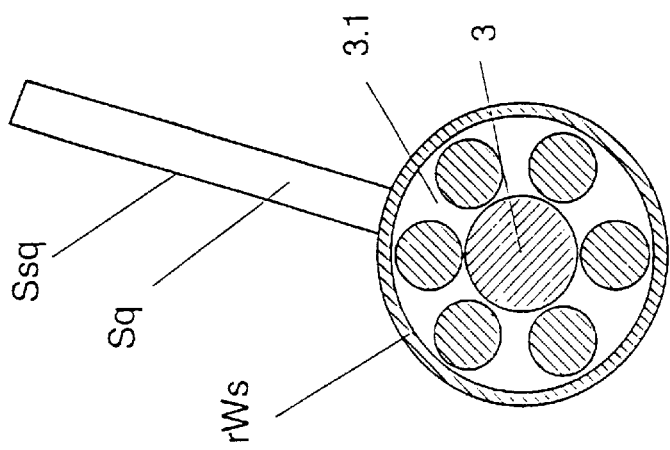
FIGS. 7a–7c show analogously to FIGS. 3a–3c, different detailed representations of a section of FIG. 2 on a larger scale, wherein the bead core 3 and a lateral force sensor Sq with its heel which is situated above the bead core are visible in this figure, namely.

Analogous to FIG. 3a, FIG. 7a shows a section of FIG. 2 on a larger scale. In this figure, the bead core 3 and the lateral force sensor Sq arranged above the bead core are visible. The heel rWs of this sensor Sq is also realized in wedge-shaped fashion so as to attain a tangent adaptation of the incline of the sensitive surface Ssq to the incline of the carcass. The heel rWs allows a simple, rigid and dimensionally accurate attachment of the sensor Sq on the bead core.

In this preferred embodiment, the required stability of the bond is achieved due to the contact adhesiveness of the rubber extrusion coating 3.1 of the bead core 3, namely because a sufficiently large contact surface for the bead core situated underneath is provided. At least the radially inner side of the heel rWs should be coated with brass or the like in order to ensure high adhesion after vulcanization.

Figure 7B:
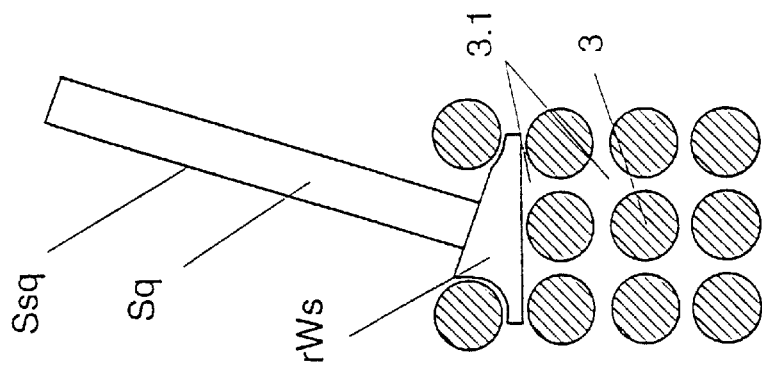

FIG. 7b shows, analogous to FIG. 3b, a different embodiment of the sensor heel rWs on the same scale. In this case, the contact adhesiveness is supplemented with a positive connection. For this purpose, an additional wire or a textile thread is placed over the radially outer region of the sensor heel rWs in such a way that its radially inner side presses against the radially outer side of the bead core 3. In this case, the additional wire may also consist of one additional winding of the wire forming the bead core.

Figure 7C:
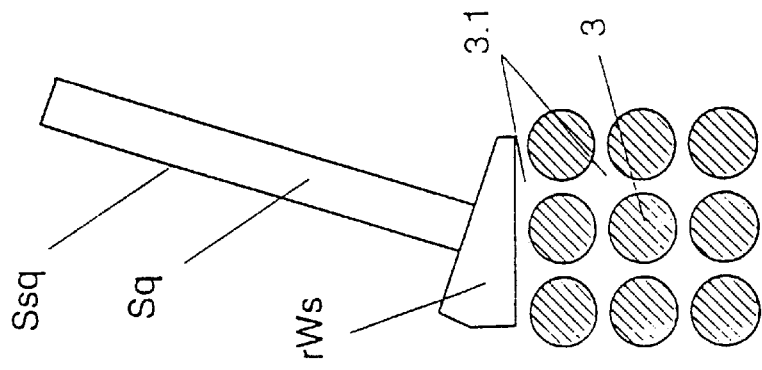

FIG. 7c shows, analogous to FIG. 3c, a third embodiment of the sensor heel rWs on the same scale, wherein this sensor heel is connected to a cable core. In order to also achieve an additional positive connection in this case, the sensor heel rWs is developed in the form of a ring that can be flattened in plastic fashion, wherein the entire cable core extends through said ring.

The previously mentioned FIG. 8 shows a longitudinal section through a lateral force sensor Sq with a sensitive surface Ssq that is completely separated from the surrounding rubber by means of a housing SG. The sensitive surface Ssq is anchored on the sensor heel rWs such that it has a high flexural strength. The two low-friction blades SC that introduce the bending of the housing which occurs under a load into the sensitive surface are shown to the left and the right of the radially outer end of the sensitive surface Ssq.

FIG. 9 shows a view of the axially inner side of a wheel, on which a tire 1 that is equipped with sensors S11, S12, S13, S14 and S15 for measuring longitudinal forces and sensors Sq1, Sq2, Sq3, Sq4 and Sq5 for measuring lateral forces is mounted. The rubber of the tire as well as the strength carrier arranged therein are, with the exception of the bead core 3, assumed to be transparent in this figure; i.e., they are neither visible nor impair the view of the tire interior. Consequently, all ten sensors S and the corresponding antennas A are visible. Each sensor S is, as shown, preferably connected directly to its antenna A. In this figure, this is achieved by realizing each antenna A in the form of a folded dipole, i.e., as a very narrow oval, one longitudinal side of which is centrally slotted at the connection point. The antenna ends are connected to the lines 7 and 8 that protrude out of the sensor heel as shown in FIG. 6a.

The antennas are arranged on the axially inner side of the bead filler 6 such that the bond consisting of the bead core 3 and the bead filler 6, if applicable, only the bead filler 6, contains all components for the traction control system which need to be arranged in the tire. Leaving aside the additional steps for equipping this bond with sensors and antennas, the method for manufacturing the tire remains the same. In addition, the antennas, if arranged on the apex 6, and the sensors are very well protected from damage by the carcass.

The sensor S11 is connected to the antenna A11. The sensor S12 is connected to the antenna A12. The sensors S13, S14 and S15 are correspondingly connected to the respective antennas A13, A14 and A15. Analogously, each of the lateral force sensors Sq1–Sq5 is connected to the respective antennas Aq1, Aq2 etc. and Aq5.

Since the reliability and accuracy of measuring the longitudinal forces are more important than the reliability and accuracy of measuring the lateral forces, the antennas A11–A15 which belong to the longitudinal force sensors S11–S15 are arranged on the axially inner side of the apex 6 in such a way that their mean radius corresponds to the radius on which the carcass inflection point lies in the cross section (see FIGS. 1 and 2). This means that the risk of these segment-shaped antennas being subjected to flexing work that causes material fatigue is minimal. The antennas Aq1–Aq5 which belong to the lateral force sensors Sq1–Sq5 are correspondingly arranged on the axially inner side of the apex 6 in such a way that their mean radius is larger than the radius on which the carcass inflection point lies. Consequently, these segment-shaped antennas describe two concentric rings, wherein the inner ring of antennas belongs to the longitudinal force sensors and the outer ring of antennas belongs to the lateral force sensors.

Theoretically, it would also be possible to arrange all antennas on only one ring, wherein antennas of longitudinal force sensors are arranged alternately with antennas of lateral force sensors. However, since the antenna length (in the circumferential direction of the tire) should amount to at least one fourth of the radio wavelength (abbreviated "quarter-wave") in order to attain sufficient signal separation and signal intensity, this could only be realized with a high frequency or a low number n of sensors so that one nth of the mean ring circumference length would amount to at least one quarter-wave.

At least for the first prototypes, sensors per sensor type proved particularly advantageous at a radio frequency of approximately 433 MHz. However, at a bead diameter of 15 inches, it would be impossible to accommodate all antennas on one ring because the circumferential length of each folded dipole amounts to lambda/4, i.e., approximately 17 cm.

In the embodiment shown, the radio frequency of all five longitudinal force sensors S1 lies at 434 MHz, and the radio frequency of all five lateral force sensors Sq lies slightly lower, namely at 433 MHz; the antennas Aq for the lateral force sensors are arranged on an outer ring of slightly longer folded dipole antennas than the antennas A1 arranged on the inner circle, i.e., the radius of the carcass inflection point.

The data identification of the longitudinal force sensors S1 is, analogous to that of the lateral force sensors Sq, realized by means of different reflection patterns.

Figure 10:
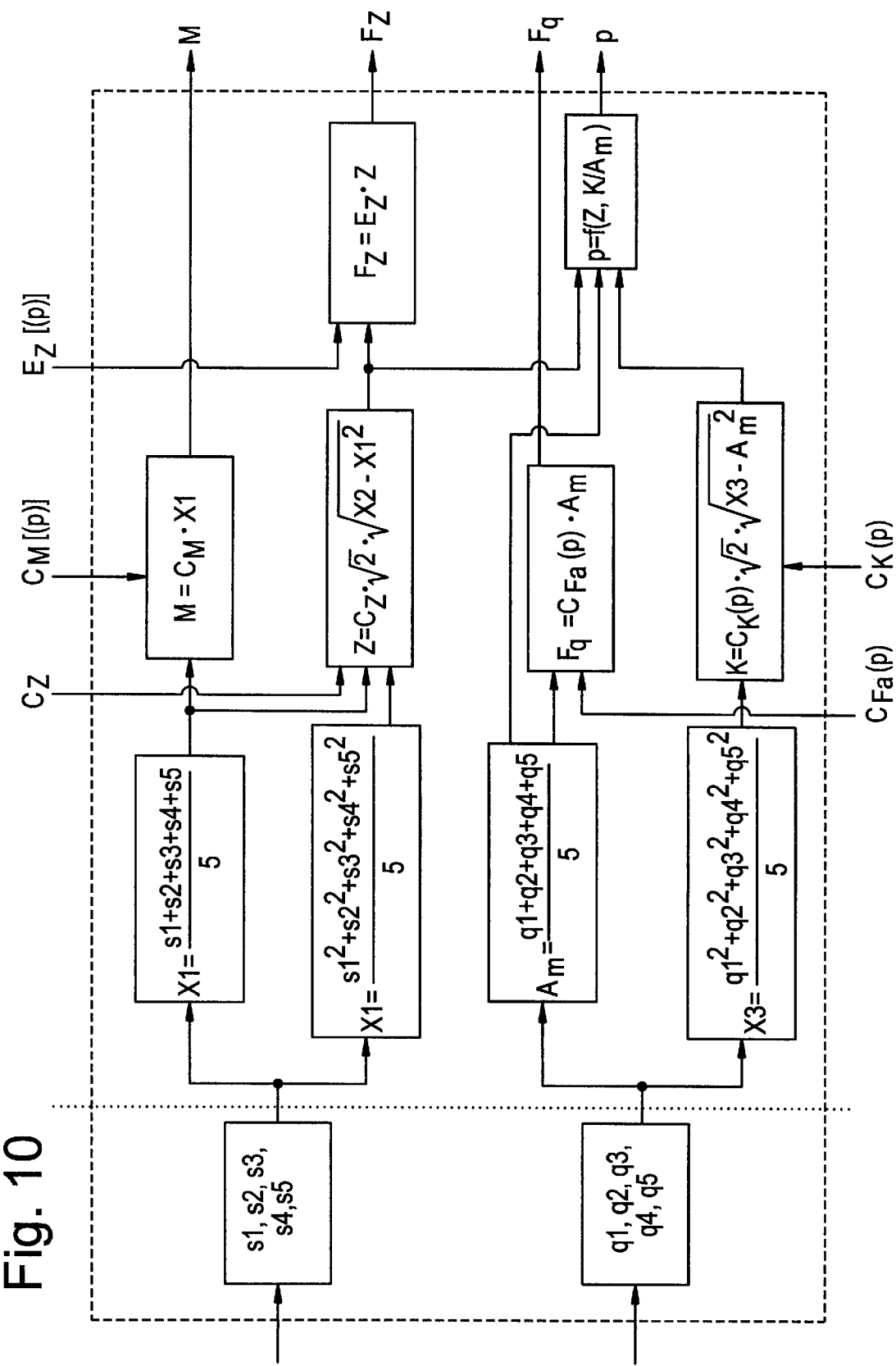
FIG. 10 shows a data acquisition and processing diagram for a friction control system according to the invention.

FIG. 10 pertains to the embodiment according to FIG. 9 and shows in the left column the actually measured data, namely the data s1–s5 of the longitudinal force sensors S11–S15 and the data q1–q5 of the lateral force sensors Sq1–Sq5.

In addition, an, air pressure-independent, factor Cz, two proportionality factors $C_M[(p)]$ and $E_z[(p)]$ that are also air pressure-independent in the chosen sensor position in the carcass inflection point as well as the two functions $C_{Fa}(P)$, $C_K(p)$ are stored. The two latter-mentioned functions only depend on the pneumatic overpressure of the tire (frequently referred to as the "pneumatic pressure" or "pressure"), but not on external tire forces. These functions are stored in a data memory as the result of a tire calibration and can be retrieved.

Alternatively to the storage of individual tire data or the storage of specific tire series data, it would also be possible to implement a neuronal network that determines these four variables by means of plausibility checks of the final results as a function of a variation of these four variables.

After explaining the input data, the following description pertains to predominantly used on-line data processing. The description begins with the logic component on the very top in the second column from the left, then the logic component situated adjacent thereto on the right, then the second from the top in the second column from the left, etc.

The data processing begins with the data s1–s5. Initially, the arithmetic mean of these data is determined and stored in a memory X1. Subsequently, the arithmetic mean of the second power of data s1–s5 is determined and stored in a memory X2. The arithmetic mean of the data q1–q5 is then determined and stored in a memory $A_m$. Subsequently, the arithmetic mean of the second power of data q1–q5 is determined and stored in a memory X3.

After this first data processing stage, the intermediate value stored in the memory X1 is input into a multiplier together with the $C_M$ selected from the function $C_M[(p)]$ for the existing air pressure. The result output by the multiplier describes the torque M engaging the wheel. Due to the proportionality between this torque and the longitudinal force engaging the tire, the longitudinal force can also be obtained after a division by the tread radius.

In addition, it would be possible to correspondingly incorporate the tread radius into the function $C_M[(p)]$, in which case the result would represent the longitudinal tire force instead of the torque M. Information on the longitudinal tire force or the tire torque M is of the utmost importance for a friction control system because the length of the stopping distance highly depends on these factors.

In order to determine the tire deformation, the second power of the arithmetic mean of the measuring signals initially needs to be deducted from the arithmetic mean of the second power of the measuring signals. For this purpose, the second logic component from the top in the third column from the left initially retrieves the intermediate values from the memories X1 and X2 and forms the difference $X2-X1^2$.

The same component then takes the square root of this difference, multiplies the square root by a proportionality factor $C_z$ times the square root of 2 (instead of storing the factor $C_z$ that describes the stiffness distribution and its subsequent multiplication by the square root of 2, it would also be possible to initially store the factor root-of-2-times in order to additionally increase the computing speed), and stores this intermediate result in a memory Z. The content of this memory describes the tire deformation.

Subsequently, the intermediate value stored in the memory Z is input into the multiplier shown to the right of this memory together with the selected Ez from the function $E_z[(p)]$ for the existing tire pressure. The result output by this multiplier describes the vertical force engaging the tire (=wheel load).

Figure 11:
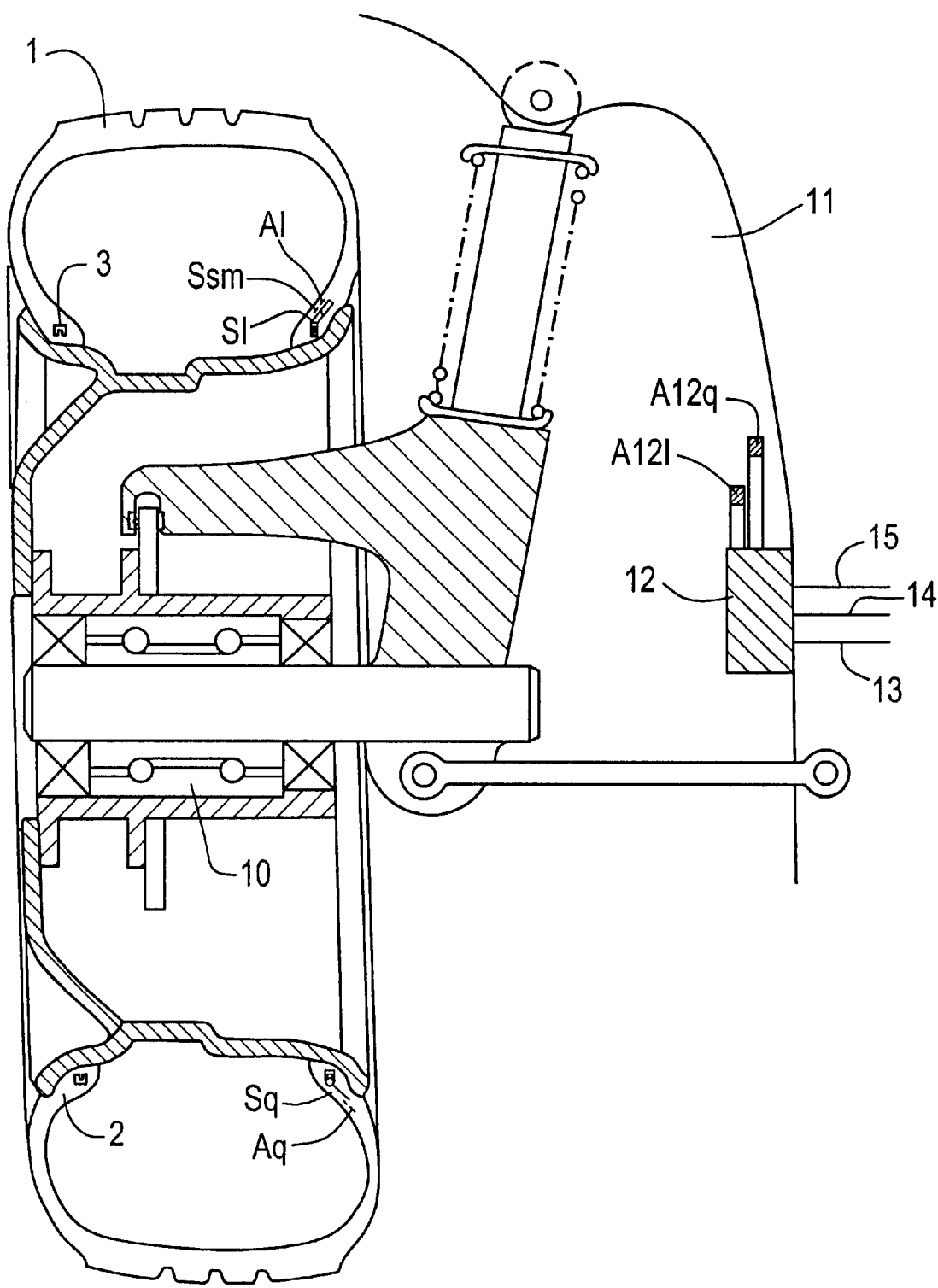
FIG. 11 shows a wheel well with a pneumatic tire and all components required for the system in the form of a section transverse to the driving direction.

FIG. 11 shows the previously described wheel including all components required for the invention and the corresponding wheel well region in the form of a central section through the wheel bearing 10 perpendicular to the driving direction. The plane of section extends through a longitudinal force sensor S1 on the top and through a lateral force sensor Sq on the bottom, including the corresponding antennas A1 and Aq. In the vicinity of the rotational axis of the wheel, a unit 12 that contains all electronic components for the transmission function, the reception function and the data processing in only one housing is arranged on the side of the wheel well 11 which faces the wheel.

A person skilled in the art of communications engineering, in particular, radio engineering, is familiar with the electronic components for the transmission and reception functions. This component essentially consists of amplifiers in the form of integrated circuits that are composed of semiconductors and narrow frequency pass filters; frequency modulators or amplitude modulators as well as corresponding demodulators are also required in this transmitter—in contrast to conventional radio technology. This means that the same electronic components can largely be used for the transmission and the reception functions, i.e., cost and error susceptibility are reduced. The unit 12 consequently fulfills the functions which could also be carried out in a non-rotating transmitter G and a non-rotating transmitter E. In addition to conventional radio components, the unit 12 needs to contain timing circuits, the essential item of which should consist of quartz as is known from chronometers.

The logic components contained in the unit 12 are described in greater detail in FIG. 10.

The unit 12 contains two antennas A121 and A12q which describe sectors of a circle and are aligned approximately concentric to the wheel axis.

The unit 12 receives a direct current from the accumulator-buffered on-board network via a two-pole electric line 13. In vehicles in which two different on-board networks are available, it suffices to connect the unit to the less powerful network; due to this measure, the disadvantageous effects of consumption peaks by other consumers, e.g., rear window defroster, electric power steering systems and electric brake actuating systems are eliminated.

The unit delivers its data pertaining to the longitudinal force, the lateral force, the wheel load and the pneumatic pressure to the not-shown, generally known computer for controlling brake maneuvers which combines the functions of ABS, ASR and ESP via an additional line 14 that is preferably realized in the form of a shielded four-pole cable; an additional line may extend from this computer to the dashboard, e.g., for warning purposes.

As is shown, it is preferred that one additional line 15 leads into the unit 12. This line 15 should be developed in the form of a five-pole line in order to supply the logic unit with data $C_z$, $C_m$, $E_z$, $C_{Fa}$, and $C_K$.

The scope of protection of the claims is not limited to the particularly preferred embodiment according to FIGS. 1–11, but is intended to encompass within the appended claims all modifications and variations that would be apparent to those skilled in the art from the foregoing.

German priority application 199 00 082.4 is relied on and incorporated herein by reference.

A list of reference symbols forms part of this description.

List of Reference Symbols

| | |
|---|---|
| 1 | Pneumatic automobile tire |
| 2 | Beads of 1 |
| 3 | Bead cores in 2 |
| 3.1 | Caoutchouc extrusion coating of the bead core 3 |
| 4 | Carcass anchored on 3 |
| 5 | Belt layers |
| 6 | Bead filler (=apex) |
| 7 | Signal-conducting electric line in the sensor heel rWs |
| 8 | Signal-conducting electric line in the sensor heel rWs |
| 9 | |
| 10 | Wheel bearing |
| 11 | Wheel well |
| 12 | Unit for transmitting, receiving and processing signals |
| 13 | Electric line (two-pole) |
| 14 | Line (four-pole) for the data F1 or M, Fq, Fz and p |
| 15 | Line (five-pole) for calibration constants |

A Antenna
  A1 Antenna for radio reception by a longitudinal force sensor and for transmitting a slow echo containing data from this longitudinal force sensor
  A11 Antenna A1 for the first sensor S1 (=S11)
  A12 Antenna A1 for the second sensor S1(=S12)
  A13 Antenna A1 for the third sensor S1 (=S13)
  A14 Antenna A1 for the fourth sensor S1 (=S14)
  A15 Antenna A1 for the fifth sensor S1 (=S15)
Aq Antenna for radio reception by a lateral force sensor and for transmitting a slow echo containing data from this lateral force sensor
  Aq1 Antenna A1 for the first sensor Sq (=Sq1)
  Aq2 Antenna A1 for the second sensor Sq (=Sq2)
  Aq3 Antenna A1 for the third sensor Sq (=Sq3)
  Aq4 Antenna A1 for the fourth sensor Sq (=Sq4)
  Aq5 Antenna A1 for the fifth sensor Sq (=Sq5)
A121 transmission and reception antenna on unit 12 for communicating with the antennas A1 of the longitudinal force sensors S1
A12q transmission and reception antenna on unit 12 for communicating with the antennas Aq of the lateral force sensors Sq
E Receiver for radio signals, installed in the automobile in non-rotating fashion (not shown as a separate component in any figure; shown as part of the unit 12 in FIG. 11)
Es Reception antenna
F forces to be sensed which act upon Ss
  F1 Longitudinal forces
  Fq Lateral forces
G Transmitter of radio signals, installed in the automobile in non-rotating fashion (not shown as a separate component in any figure; shown as part of the unit 12 in FIG. 11)
I Interdigital comparator
S Sensor
  S1 Sensor for sensing longitudinal forces
    S11 Longitudinal force sensor 1 (see FIG. 9)
    S12 Longitudinal force sensor 2
    S13 Longitudinal force sensor 3
    S14 Longitudinal force sensor 4
    S15 Longitudinal force sensor 5
  Sq Sensor for sensing lateral forces
    Sq1 Lateral force sensor 1 (see FIG. 9)
    Sq2 Lateral force sensor 2

Sq3 Lateral force sensor 3
Sq4 Lateral force sensor 4
Sq5 Lateral force sensor 5
SC Blades between Ss and SG (see FIG. 4)
SG Sensor housing
  Ss Sensitive surface of S
  Ssm Radial center of Ss
  Ssp Piezo-crystalline layer of Ss
rWs heel of S

We claim:

1. Pneumatic vehicle tire comprising:
   a carcass,
   a bead with a bead core arranged in said bead, and
   a first sensor located within said bead, wherein said first sensor delivers signals which are correlated to longitudinal and lateral forces transmitted by the pneumatic vehicle tire during operation of the pneumatic vehicle tire wherein;
   (a) said sensor operates in a passive radio transmission method,
   (b) the sensor receives a radio signal from a non-rotating sender,
   (c) the sensor alters the received radio signal in a defined correlation with a variable to be sensed, and
   (d) the sensor transmits an altered signal to a receiver.

2. The pneumatic vehicle tire according to claim 1, wherein said first sensor has a first end and a second end, wherein the first end includes a heel attached to the bead core, and wherein the second end extends radially outward from the bead core within the tire.

3. The pneumatic vehicle tire according to claim 1, wherein said first sensor is flat and of sufficient axial extent to sense longitudinal forces in a circumferential direction of the tire.

4. The pneumatic vehicle tire according to claim 1, wherein said first sensor is flat and of sufficient extent in a circumferential direction of the tire to sense lateral forces in an axial direction of the tire.

5. The pneumatic vehicle tire according to claim 1, further comprising a second sensor, wherein the first sensor and the second sensor are arranged on a track near the bead core in uniform phase distribution in order to measure a longitudinal force in a circumferential direction of the tire and/or to measure tire deflection.

6. The pneumatic vehicle tire according to claim 1, further comprising a second sensor and a third sensor, wherein the first sensor, the second sensor, and the third sensor are arranged on a track near the bead core in uniform phase distribution in order to measure lateral force in an axial direction of the tire.

7. The pneumatic vehicle tire according to claim 1, further comprising a plurality of sensors for sensing longitudinal forces in a circumferential direction of the tire and a plurality of sensors for sensing lateral forces in an axial direction of the tire.

8. The pneumatic vehicle tire according to claim 1,
   the carcass of which having a point of inflection in its cross section,
   said point of inflection being arranged in a first radial distance from the bead core,
   wherein said sensor has a sensitive surface comprising a radial center Ssm thereon,
   said radial center being arranged at a second radial distance from the bead core,
   said first radial distance and said second radial distance being of the same amount at which a cross section of the carcass has a point of inflection.

9. The pneumatic vehicle tire according to claim 1, wherein said sensor is provided with at least one layer with at least one piezoelectric crystal which couples an electric wave to an acoustic surface wave, thereby reducing a propagation speed of the electric wave to a propagation speed of the acoustic surface wave.

10. The pneumatic vehicle tire according to claim 9, wherein the piezoelectric crystal is $SiO_2$.

11. The pneumatic vehicle tire according to claim 9, wherein the sensor is provided with an interdigital converter.

12. The pneumatic vehicle tire according claim 11, wherein:
    (a) the radio signal being received by the sensor has a reception frequency,
    (b) the altered signal sent by the sensor has a transmission frequency, and
    (c) both the transmission frequency and the reception frequency lie between 20 MHz and 2.5 GHz.

13. The pneumatic vehicle tire according to claim 1, wherein the tire includes a plurality of sensors and all sensors of the tire operate with transmission frequencies which differ from one another at least to such a degree that the signals transmitted by the sensors back to a receiver can be separated from one another.

14. The pneumatic vehicle tire according to claim 12, wherein the tire includes a plurality of sensors for sensing longitudinal forces in a circumferential direction of the tire and a plurality of sensors for sensing lateral forces in an axial direction of the tire, wherein all longitudinal force sensors operate with a first transmission frequency, wherein signals sent back to the receiver can be separated from one another because the sensors significantly differ with respect to an arrangement of reflecting structures incorporated in the sensors, and wherein all lateral force sensors operate with a second transmission frequency, wherein signals sent back to the receiver can be separated from one another because the sensors significantly differ with respect to an arrangement of reflecting structures incorporated in the sensors.

15. The pneumatic vehicle tire according to claim 12, wherein the tire includes a plurality of sensors for sensing longitudinal forces in a circumferential direction of the tire and a plurality of sensors for sensing lateral forces in an axial direction of the tire,
    wherein each longitudinal force sensor operates with a different transmission frequency, and wherein each lateral force sensor operates with a transmission frequency that matches one of the transmission frequencies of the longitudinal force sensors, wherein all longitudinal force sensors have a first reflecting structure, and wherein all lateral force sensors have a second reflecting structure which differs from the first reflecting structure at least to such a degree that the signals of all sensors contained in one tire can be separated from one another.

16. The pneumatic vehicle tire according to claim 12, wherein all sensors of said tire operate with a first transmission frequency, wherein signals transmitted back to the receiver can be separated from one another because the sensors differ with respect to an arrangement of reflecting structures incorporated in the sensors at least to such a degree that the signals transmitted back to the receiver significantly differ from one another.

17. The pneumatic vehicle tire according to claim 1, further comprising an annular antenna in said tire, wherein the annular antenna may be uninterrupted or divided into sectors, wherein a mean radius of said annular antenna lies near or exactly on a radius on which a cross section of the carcass has a turning point.

18. The pneumatic vehicle tire according to claim 1, further comprising surface wave components directly embedded in a region of the tire that is free of butyl rubber.

19. The pneumatic vehicle tire according to claim 1, wherein:
  (a) the sensor receives the radio signal from the non-rotating sender in a phase position,
  (b) the sensor alters the phase position of the received radio signal in a defined correlation with the variable to be sensed, and
  (c) the sensor transmits said signal with an altered phase position to said receiver.

20. The pneumatic vehicle tire according to claim 19, wherein:
  (a) the sensor transmits a plurality of signals after receiving one radio signal;
  (b) all the transmitted signals are altered in their phase positions in a defined correlation with the variable being sensed, and
  (c) the tire including the sensor is identifiable among other tires of the vehicle by a sequence of transmitted signals in the plurality of transmitted signals because of the one received radio signal.

21. The pneumatic vehicle tire according claim 1, wherein:
  (a) the radio signal being received by the sensor has a reception frequency,
  (b) the altered signal sent by the sensor has a transmission frequency, and
  (c) both the transmission frequency and the reception frequency lie between 20 MHz and 2.5 GHz.

22. The pneumatic vehicle tire according to claim 21, wherein both the transmission frequency and the reception frequency are identical.

23. The pneumatic vehicle tire according to claim 12, wherein both the transmission frequency and the reception frequency are identical.

* * * * *